United States Patent
Sumi et al.

(10) Patent No.: US 7,416,569 B2
(45) Date of Patent: Aug. 26, 2008

(54) FUEL GAS PRODUCTION APPARATUS AND METHOD OF STARTING OPERATION OF FUEL GAS PRODUCTION APPARATUS

(75) Inventors: Hideaki Sumi, Utsunomiya (JP); Hikaru Okada, Asaka (JP); Satoshi Hanai, Suzaka (JP); Hiroshi Machida, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 424 days.

(21) Appl. No.: 11/090,817

(22) Filed: Mar. 24, 2005

(65) Prior Publication Data

US 2006/0088468 A1 Apr. 27, 2006

(30) Foreign Application Priority Data

Mar. 24, 2004 (JP) .............................. 2004-086973

(51) Int. Cl.
*C01B 3/32* (2006.01)
*B01D 53/02* (2006.01)
*B01D 59/26* (2006.01)
*B01D 53/12* (2006.01)

(52) U.S. Cl. .............................. 48/127.3; 95/90; 95/95; 95/96; 96/108; 96/109

(58) Field of Classification Search ................ 48/127.3; 95/90–140; 96/108–154
See application file for complete search history.

(56) References Cited

U.S. PATENT DOCUMENTS 5,961,928 A * 10/1999 Maston et al. ............... 422/110
6,063,161 A * 5/2000 Keefer et al. .................. 95/100
6,224,651 B1 * 5/2001 Monereau et al. .............. 95/19

FOREIGN PATENT DOCUMENTS

| JP | 1-164714 | 6/1989 |
| JP | 3-161008 | 7/1991 |
| JP | 2002-020102 | 1/2002 |
| JP | 2002-355521 | 12/2002 |

OTHER PUBLICATIONS

Mitsubishi Petrochemical Co. Ltd., "Development of PSA Carbon Dioxide Gas Separation Process," *Chemitopia*, vol. 8:44-51 (1991).
Japanese Office Action for Application No. 2004-086973, dated Nov. 20, 2007.

* cited by examiner

*Primary Examiner*—Alexa D. Neckel
*Assistant Examiner*—Matthew J Merkling
(74) *Attorney, Agent, or Firm*—Lahive & Cockfield, LLP; Anthony A. Laurentano, Esq.

(57) ABSTRACT

A PSA mechanism has adsorption towers. Cleaning valves and off gas valves are connected to the adsorption towers. Valve positions of at least either the cleaning valves or the off gas valves are determined based on an operation suspension period of the PSA mechanism or internal conditions which vary depending on the operation suspension period.

8 Claims, 21 Drawing Sheets

FUEL GAS PRODUCTION APPARATUS AND METHOD OF STARTING OPERATION OF FUEL GAS PRODUCTION APPARATUS

BACKGROUND OF THE INVENTION

1. Field of the Invention

The present invention relates to a fuel gas production apparatus for reforming a hydrogen-containing fuel into a reformed gas, and refining the reformed gas to produce a hydrogen-rich fuel gas. Further, the present invention relates to a method of starting operation of the fuel gas production apparatus.

2. Description of the Related Art

For example, hydrogen production apparatuses (fuel gas production apparatuses) for reforming a hydrocarbon fuel such as natural gas or a hydrogen-containing fuel such as an alcohol (e.g., methanol) into a hydrogen-containing gas (reformed gas), and refining the hydrogen-containing gas to produce a fuel gas supplied to a fuel cell or the like are adopted conventionally.

For example, Japanese Laid-Open Patent Publication No. 2002-20102 discloses a hydrogen production apparatus shown in FIG. 21. The hydrogen production apparatus includes a compressor 1, a hydrodesulfurization unit 2, a steam reformer 3, a catalyst combustor 4, a gas shift reactor 5, and a PSA (Pressure Swing Adsorption) unit 6. A fuel gas such as a city gas is supplied to the hydrodesulfurization unit 2. After desulfurization of the fuel, the steam reformer 3 reforms the fuel by steam reforming to produce a hydrogen-containing gas (hydrogen rich gas). The catalyst combustor 4 is provided around the steam reformer 3, and combusts the hydrogen and oxygen in the air using catalyst. The gas shift reactor 5 induces a shift reaction for converting carbon monoxide in the hydrogen-containing gas into carbon dioxide and hydrogen. After the gas shift reaction, the PSA unit 6 refines the hydrogen-containing gas into highly pure hydrogen by pressure adsorption.

A hydrogen storage tank 8 and an off gas holder 9 are connected to the PSA unit 6. The hydrogen storage tank 8 temporarily stores the highly pure hydrogen before it is supplied to a polymer electrolyte fuel cell (PEFC) 7. The off gas holder 9 temporarily stores the off gas (impurities) removed by pressure adsorption in the PSA unit 6. The off gas holder 9 supplies the off gas to the catalyst combustor 4 as a fuel for heating the steam reformer 3.

The PSA unit 6 has a plurality of adsorption towers filled with adsorbent material for selectively adsorbing impurities (components other than hydrogen) under high pressure, and desorbing the adsorbed components under low pressure. A series of steps comprising adsorption of impurities, desorption of impurities, replacement of the gas, and pressurization are performed in a cyclic manner in each of the adsorption towers for obtaining the highly pure hydrogen, and discharging the other gas components as the off gas.

For the purpose of interrupting operation of the hydrogen production apparatus, the PSA unit 6 stores interruption conditions of the respective towers in advance. Assuming that the PSA unit 6 has three adsorption towers, generally, two adsorption towers are stopped at high pressures, and the remaining one tower is stopped at a pressure substantially the same as, or lower than the air pressure. The pressure condition is maintained until operation of the hydrogen production apparatus is started again.

However, if operation of the hydrogen production apparatus is suspended for a long period of time, transition to the chemical equilibrium condition occurs in the towers at the high pressure, and the gas components tend to be distributed uniformly in the towers. Thus, when operation of the hydrogen production apparatus is started from the cleaning step, gas components of the cleaning gas moving between the towers may include a lot of impurity components such as a carbon dioxide gas or a nitrogen gas, though the chief gas component of the intended cleaning gas is the hydrogen gas. The impurity gas has a large pipe resistance in comparison with the hydrogen gas.

Therefore, the flow rate of the cleaning gas is reduced, and the amount of the discharged off gas is reduced. As a result, calorie shortage occurs for the capacity of the catalyst combustor 4, and the temperature of the catalyst combustor 4 decreases. In order to address the problem, it is necessary to provide additional fuel supply to the catalyst combustor 4.

Further, in the desorption step, a large amount of the off gas remaining in the towers is supplied to the catalyst combustor 4. Therefore, the catalyst combustor 4 may be heated to the excessively high temperature. Thus, thermal load is applied to the catalyst combustor 4 undesirably.

SUMMARY OF THE INVENTION

A main object of the present invention is to provide a fuel gas production apparatus and a method of starting operation of the fuel gas production apparatus in which operation of the fuel gas production apparatus is started efficiently and suitably regardless of the operation suspension period of a pressure swing adsorption mechanism.

The present invention relates to a fuel gas production apparatus. The fuel gas production apparatus comprises a reforming unit for reforming a hydrogen-containing fuel to obtain a reformed gas, and a refining unit including a pressure swing adsorption mechanism for removing impurities from the reformed gas to refine the reformed gas into a hydrogen-rich fuel gas. The pressure swing adsorption mechanism includes adsorption towers, cleaning valves for connecting the adsorption towers with each other for cleaning, and off gas valves for discharging a gas remaining in the adsorption towers. The term "hydrogen-containing fuel" herein means any fuel which contains hydrogen element, such as hydrocarbon or alcohol.

The pressure swing adsorption mechanism further includes a control unit for adjusting valve positions of at least either the cleaning valves or the off gas valves based on an operation suspension period of the pressure swing adsorption mechanism or based on an internal condition which varies depending on the operation suspension period. The term "internal condition" herein means any conditions which vary depending on the operation suspension period such as the pressure in the adsorption tower of the pressure swing adsorption mechanism, the temperature of a heating unit, and the flow rate of the off gas.

Further, the present invention relates to a method of starting operation of a fuel gas production apparatus. The fuel gas production apparatus comprises a reforming unit for reforming a hydrogen-containing fuel to obtain a reformed gas, and a refining unit including a pressure swing adsorption mechanism for removing impurities from the reformed gas to refine the reformed gas into a hydrogen-rich fuel gas. The pressure swing adsorption mechanism includes adsorption towers, cleaning valves for connecting the adsorption towers with each other for cleaning, and off gas valves for discharging a gas remaining in the adsorption towers.

Firstly, the operation suspension period of the pressure swing adsorption mechanism or the internal condition which varies depending on the operation suspension period is detected. Based on the detected operation suspension period or the internal condition, valve positions of at least either the cleaning valves or the off gas valves are adjusted.

Further, it is preferable that the method further comprises the step of operating the pressure swing adsorption mechanism for a predetermined time in the valve positions adjusted at the time of starting operation of the pressure swing adsorption mechanism, and then, adjusting the valve positions into valve positions of a normal operating condition.

According to the present invention, since the valve positions of the cleaning valves and/or the off gas valves are adjusted, regardless of the length of the operation suspension period immediately before operation of the pressure swing adsorption mechanism, it is possible to prevent the shortage of the off gas calories or the like due to the decrease in the amount of the cleaning gas in the cleaning step. Further, since the off gas is not discharged excessively in the desorption step, it is possible to prevent the thermal load from being imposed on the heating unit. Thus, operation of the fuel gas production apparatus is started efficiently and suitably. The term "cleaning step" herein means the pressure reduction step in each tower of the pressure swing adsorption mechanism.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
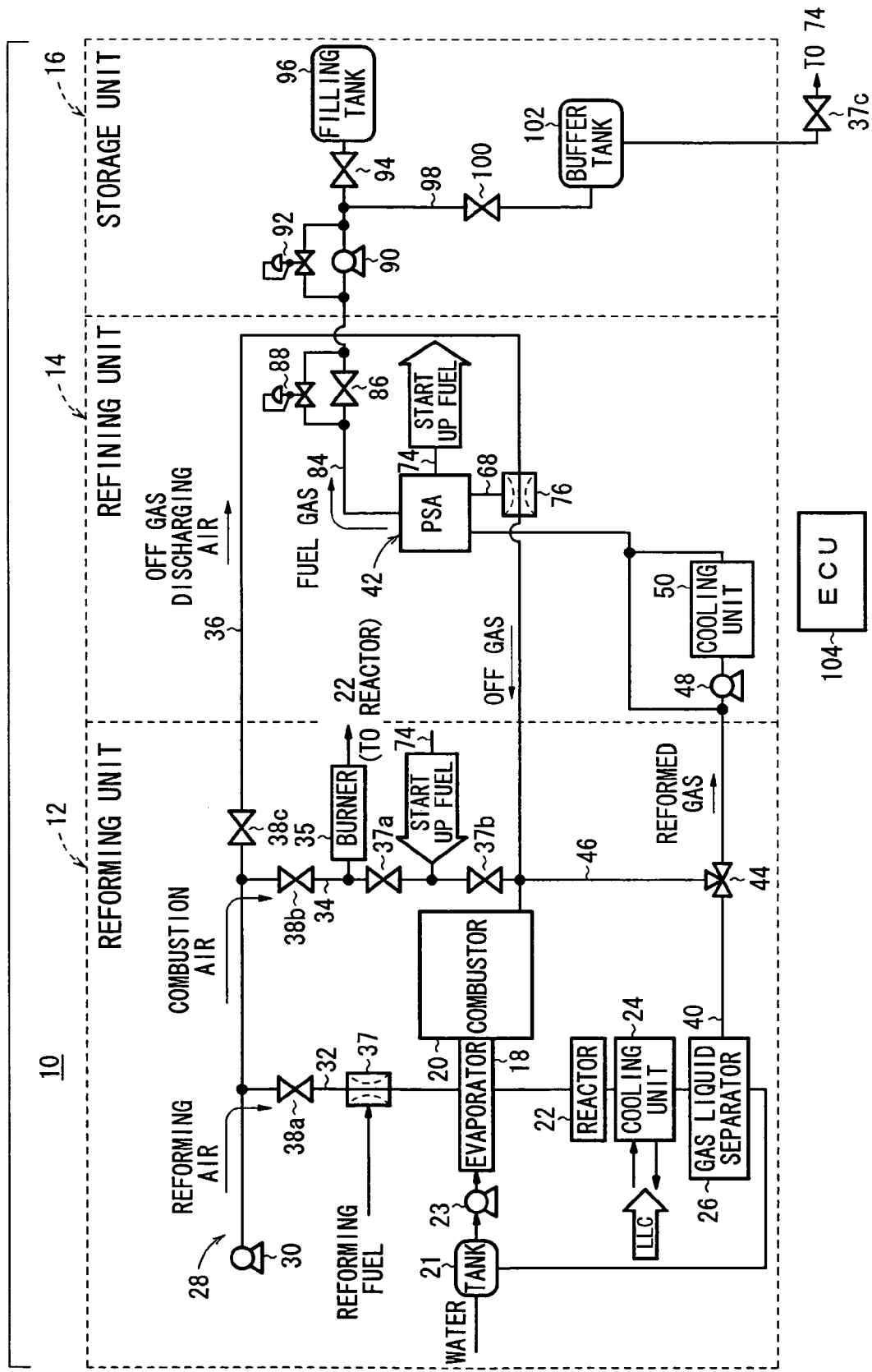
FIG. 1 is a diagram schematically showing a home fuel gas production system according to an embodiment of the present invention.

FIG. 1 is a diagram schematically showing a home fuel gas production system (fuel gas production apparatus) 10 according to an embodiment of the present invention.

The home fuel gas production system 10 includes a reforming unit 12, a refining unit 14, and a storage unit 16. The reforming unit 12 reforms a hydrogen-containing fuel, e.g., a fuel containing hydrocarbon such as methane or propane (hereinafter also referred to as the "reforming fuel") to obtain a hydrogen-rich gas (hereinafter also referred to as the "reformed gas"). The refining unit 14 refines the hydrogen rich gas to produce a highly pure hydrogen gas (hereinafter also referred to as the "fuel gas"). The storage unit 16 stores the fuel gas.

The reforming unit 12 includes an evaporator 18 for evaporating the reforming fuel using combustion catalyst. A combustor (heating unit) 20 is provided for the evaporator 18. A water supply tank 21 is connected to the evaporator 18 through a water compressor 23.

A reactor 22 for obtaining a reformed gas by reforming the reforming fuel is provided at a position downstream of the evaporator 18. A cooling unit 24 for cooling the reformed gas is provided at a position downstream of the reactor 22. Further, a gas liquid separator 26 for separating the cooled reformed gas into gas components and liquid components is provided at a position downstream of the cooling unit 24. The water removed by the gas liquid separator 26 is supplied to the water supply tank 21.

The reforming unit 12 has an air supply mechanism 28. The air supply mechanism 28 includes an air compressor 30. A reforming air supply passage 32, a combustion air supply passage 34, and an off gas discharging air supply passage 36 are connected to the air compressor 30. The reforming air supply passage 32 is connected to the evaporator 18 through an ejector 37 for sucking the reformed gas by the reforming air. The combustion air supply passage 34 is connected to an intermediate position of the off gas discharging air supply passage 36 through valves 37a, 37b and a burner 35 for supplying a hot air to the reactor 22. The off gas discharging air supply passage 36 is connected to the combustor 20 through a PSA (Pressure Swing Adsorption) mechanism 42 as described later. The reforming air supply passage 32, the combustion air supply passage 34, and the off gas discharging air supply passage 36 are connectable to the air compressor 30 through valves 38a, 38b, and 38c.

The PSA mechanism 42 of the refining unit 14 is connected to the downstream side of the gas liquid separator 26 through a reformed gas supply passage 40. After the removal of moisture, the reformed gas is supplied to the PSA mechanism 42. A branch passage 46 is connected to the reformed gas supply passage 40 through a three-way valve 44. A compressor 48 and a cooling unit 50 are provided at positions downstream of the three-way valve 44.

Figure 2:
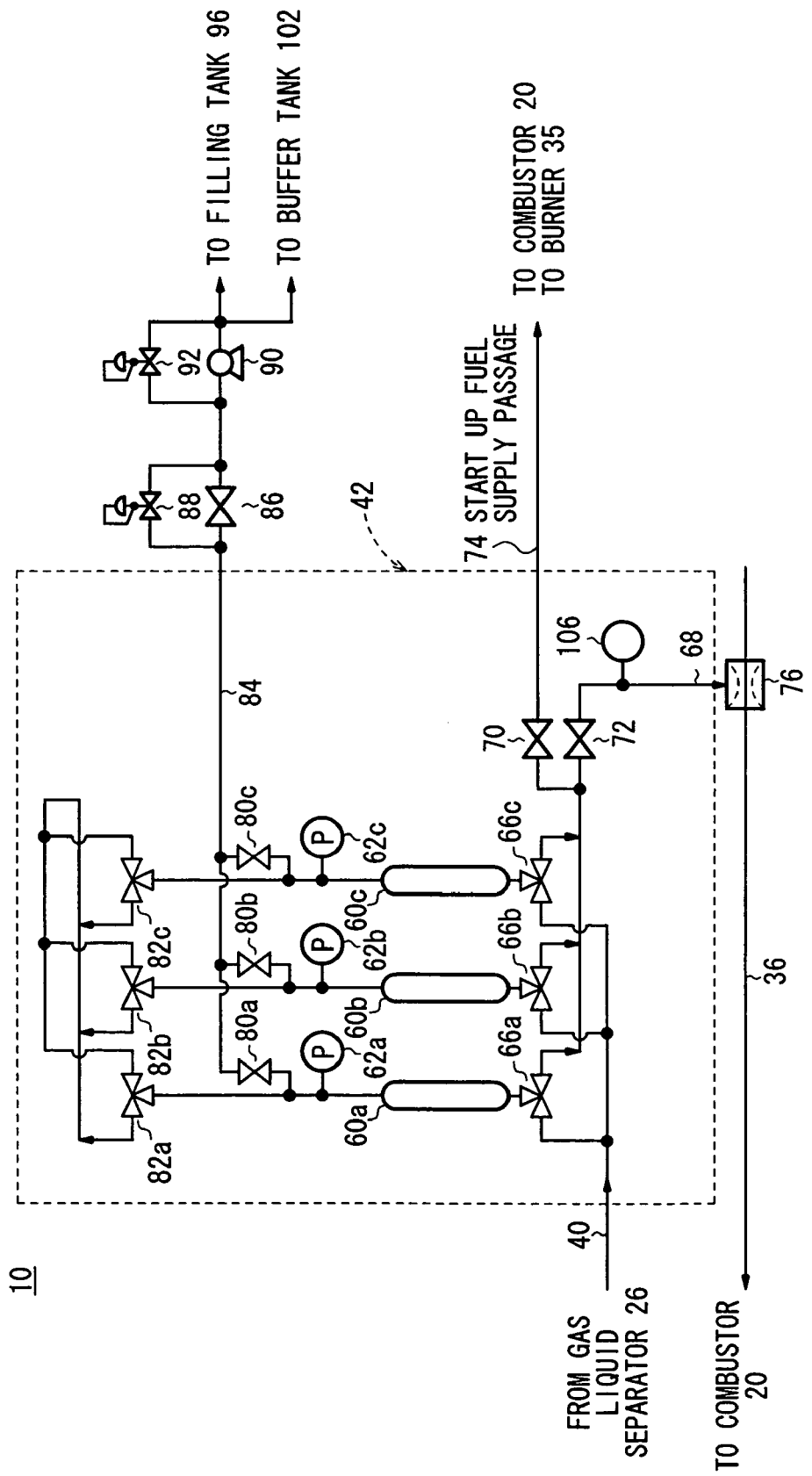
FIG. 2 is a diagram showing main components of a PSA mechanism of the home fuel gas production system.

As shown in FIG. 2, the PSA mechanism 42 comprises a tri-tower pressure swing adsorption apparatus, for example. The pressure swing adsorption apparatus has adsorption towers $60a$, $60b$, $60c$ which are connectable to the compressor 48. The adsorption towers $60a$ through $60c$ have pressure sensors $62a$ through $62c$ for detecting the pressures in the adsorption towers $60a$ through $60c$. The adsorption towers $60a$ through $60c$ have inlet/outlet ports at lower positions, and off gas valves $66a$ through $66c$ are provided at the lower inlet/outlet ports of the adsorption towers $60a$ through $60c$. The adsorption towers $60a$ through $60c$ are connected to an off gas discharge passage 68 through the off gas valves $66a$ through $66c$.

Flow rate control valves 70, 72 are provided in parallel in the off gas discharge passage 68. The off gas discharge passage 68 is connected to the burner 35 and the combustor 20 through a start up fuel supply passage 74 by the flow rate control valve 70. Further, the off gas discharge passage 68 is connected to an intermediate position of the off gas discharging air supply passage 36 through an ejector 76.

Further, the adsorption towers $60a$ through $60c$ have inlet/outlet ports at upper positions, and fuel gas discharge valves $80a$ through $80c$ and cleaning valves $82a$ through $82c$ are provided at the upper inlet/outlet ports of the adsorption towers $60a$ through $60c$. The adsorption towers $60a$ through $60c$ are connectable to a fuel gas passage 84 through the fuel gas discharge valves $80a$ through $80c$.

As shown in FIG. 1, a flow rate control valve 86 and a pressure regulator valve 88 are provided in parallel, and a compressor 90 and a valve 92 are provided in parallel in the fuel gas passage 84. A filling tank 96 as part of the storage unit 16 is connected to the fuel gas passage 84 through a valve 94. A branch fuel gas passage 98 is connected to an intermediate position of the fuel gas passage 84. A buffer tank 102 is connected to the branch fuel gas passage 98 through a valve 100.

The filling tank 96 supplies the fuel gas to a vehicle (not shown) equipped with a fuel cell. The buffer tank 102 supplies the fuel gas to a stationary fuel cell (not shown) to generate electricity for home use in the stationary fuel cell, and supplies a start up fuel to the start up fuel supply passage 74 through a valve $37c$.

The home fuel gas production system 10 communicates with and controls auxiliary devices. The home fuel gas production system 10 includes, e.g., an ECU (Electric Control Unit) 104 as a control unit for adjusting valve positions of at least either the cleaning valves $82a$ through $82c$ or the off gas valves $66a$ through $66c$ based on the operation suspension period of the PSA mechanism 42 or internal conditions which vary depending on the operation suspension period.

Next, operation of the home fuel gas production system 10 will be described below.

In the home fuel gas production system 10, the ECU 104 operates the air compressor 30 for supplying the reforming air, the combustion air, and the off gas discharging air to the reforming air supply passage 32, the combustion air supply passage 34, and the off gas discharging air supply passage 36, respectively.

The reforming air flows through the reforming air supply passage 32, and is supplied to the evaporator 18. Further, a reforming fuel such as a natural gas and water are supplied to the evaporator 18. The combustion air is supplied to the combustor 20, and hydrogen or the like is supplied to the combustor 20 as necessary for combustion to evaporate the reforming fuel and water at the evaporator 18.

The evaporated reforming fuel is supplied to the reactor 22. In the reactor 22, a fuel gas in the reforming fuel such as methane and oxygen and vapor in the air are used to induce oxidation reaction $CH_4+2O_2 \rightarrow CO_2+2H_2O$ (exothermic reaction) and fuel reforming reaction $CH_4+2H_2O \rightarrow CO_2+4H_2$ (endothermic reaction) simultaneously (autothermal reforming).

As described above, the reformed gas produced by the reactor 22 is cooled by the cooling unit 24, and supplied to the gas liquid separator 26. After the moisture is removed by the gas liquid separator 26, the reformed gas is supplied toward the reformed gas supply passage 40, and compressed by the compressor 48. Then, the reformed gas is supplied selectively to the adsorption towers $60a$ through $60c$ of the PSA mechanism 42 (see FIG. 2).

Figure 3:
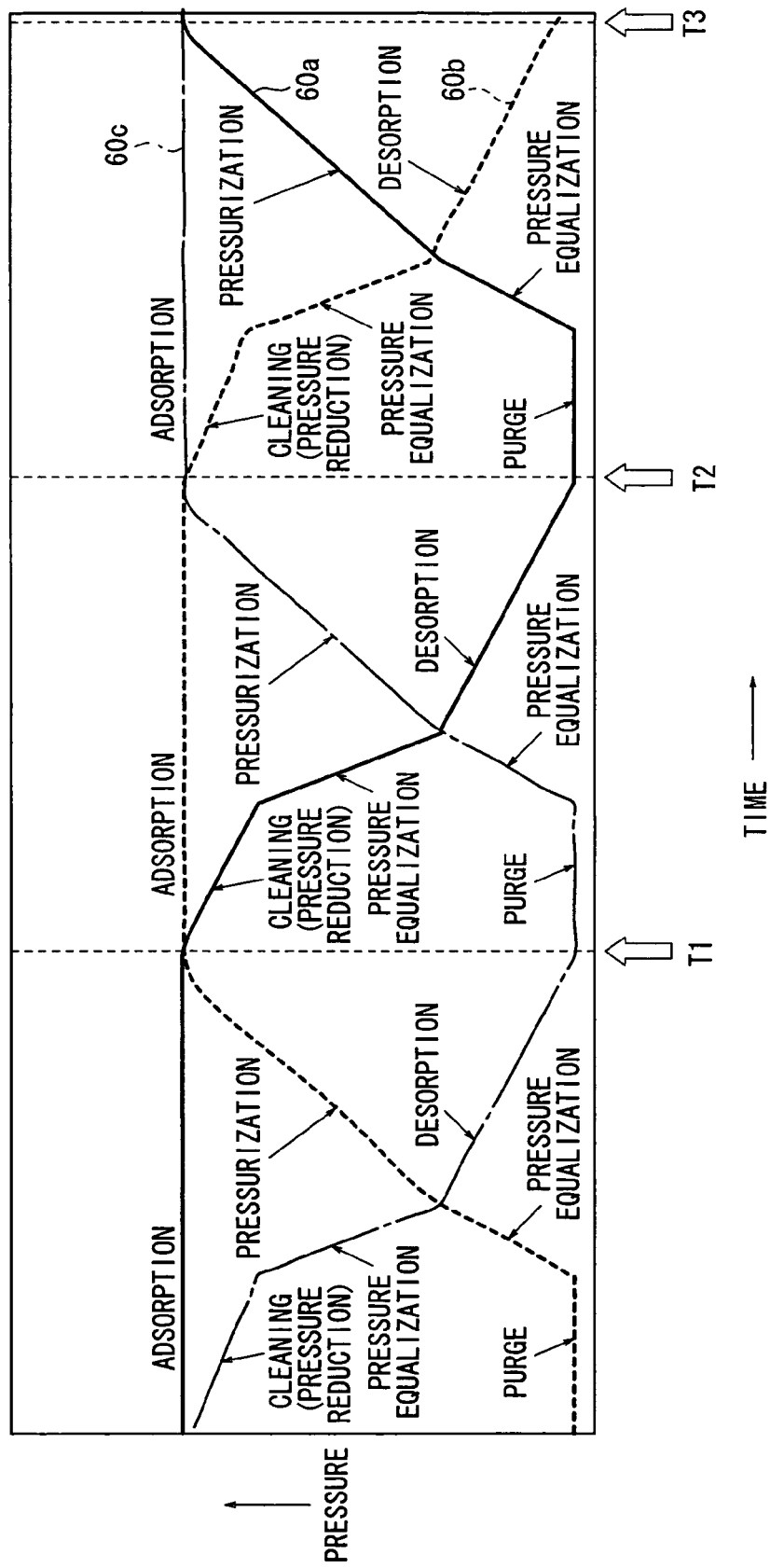
FIG. 3 is a timing chart showing operation of the PSA mechanism.

At this time, as shown in FIG. 3, in the PSA mechanism 42, for example, an adsorption step is performed in the adsorption tower $60a$, a purging step is performed in the adsorption tower $60b$, and a cleaning (pressure reduction) step is performed in the adsorption tower $60c$ simultaneously. Therefore, in the adsorption tower $60a$, gas components other than hydrogen are removed from the reformed gas by adsorption, and the reformed gas is refined to produce a fuel gas (hydrogen rich gas) having high hydrogen concentration. The fuel gas is supplied to the fuel gas passage 84. As shown in FIG. 1, the fuel gas is selectively stored in the filling tank 96 and the buffer tank 102 by the action of the compressor 90.

Figure 4:
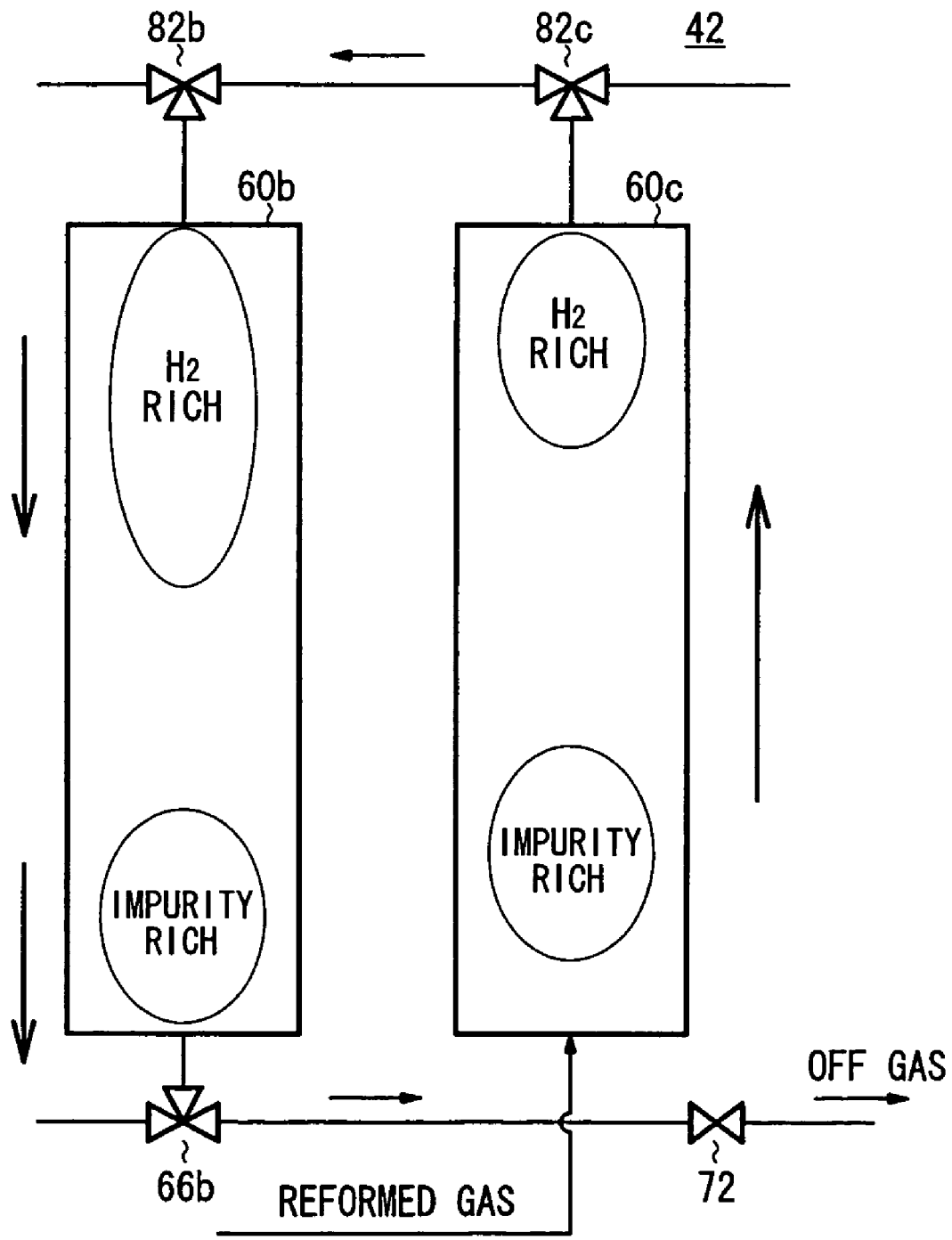
FIG. 4 is a diagram showing a condition in which a cleaning gas is supplied from an adsorption tower 60c to an adsorption tower 60b.

Next, operation in the adsorption towers $60c$, $60b$ will be described with reference to FIG. 4. When the adsorption tower $60c$ is placed in the cleaning step, the cleaning gas (reformed gas) is supplied into the adsorption tower $60c$. In the adsorption tower $60c$, an impurity rich gas is present on the lower side, and a hydrogen rich gas is present on the upper side. Since the adsorption tower $60b$ is connected to the adsorption tower $60c$ through the cleaning valves $82b$, $82c$, the hydrogen rich gas which is present on the upper side in the adsorption tower $60c$ is supplied into the adsorption tower $60b$ as the cleaning gas. The amount of the hydrogen rich gas on the upper side in the adsorption tower $60b$ increases. Therefore, the impurity rich gas on the lower side in the adsorption tower $60b$ is discharged as the off gas when the off gas valve $66b$ is opened.

As shown in FIG. 3, after the adsorption step in the adsorption tower $60a$, and pressure equalization steps in the adsorption tower $60b$ and the adsorption tower $60c$ are performed, the adsorption step in the adsorption tower $60a$, the pressure increasing step in the adsorption tower $60b$, and a desorption step in the adsorption tower $60c$ are performed. Therefore, the off gas is discharged (all the remaining pressure is released) into the off gas discharge passage 68 when the off gas valve $66c$ is opened (see FIG. 5).

As shown in FIG. 1, the off gas discharge passage 68 is connected to the off gas discharging air supply passage 36. The off gas discharged into the off gas discharge passage 68 flows toward the combustor 20 by the off gas discharging air flowing along the off gas discharging air supply passage 36. The off gas is used as a combustion fuel in the combustor 20.

As described above, in the adsorption towers $60a$ through $60c$, the adsorption step, the cleaning (pressure reduction) step, the pressure equalization step, the desorption step, and the purging step are performed successively in a cyclic manner for constantly refining the reformed gas into the fuel gas. The fuel gas is supplied from the fuel gas passage 84 to the storage unit 16.

The home fuel gas production system 10 is operated to meet the requirements of energy consumption for home use. Therefore, operation of the home fuel gas production system 10 is started, and stopped repeatedly. The operating period and suspension period are not constant. For example, operation of the home fuel gas production system 10 is suspended for several hours, for several days, or for several weeks.

When operation of the home fuel gas production system 10 is stopped, in the PSA mechanism 42, the supply of steady gas flow into the adsorption towers 60a trough 60c is stopped. After operation of the home fuel gas production system 10 is stopped, the gas composition becomes uniform over time in the entire adsorption towers 60a through 60c including both of upper and lower positions. Therefore, at the time of starting operation of the PSA mechanism 42 (indicated by a condition shown in FIG. 4), impurities are mixed in the cleaning gas flowing from the adsorption tower 60c to the adsorption tower 60b.

Figure 5:
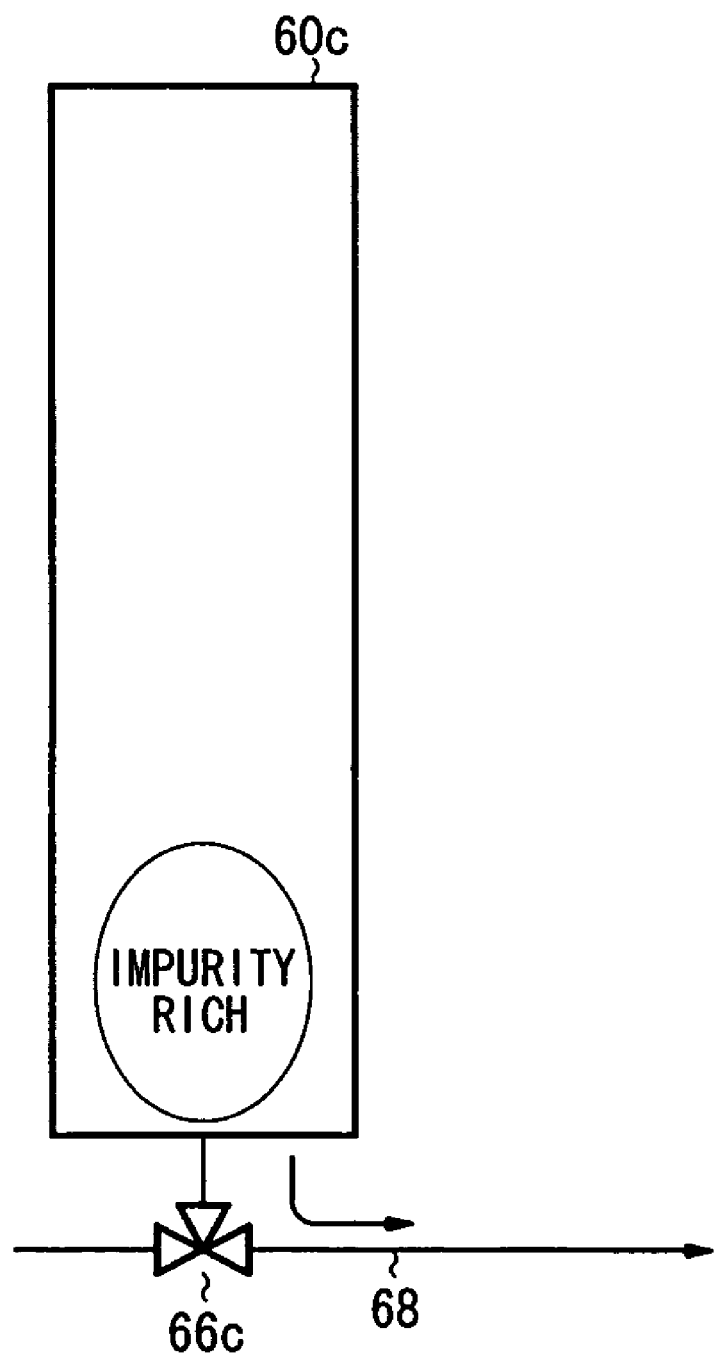
FIG. 5 is a diagram showing a desorption step in the adsorption tower 60c.

At this time, a large amount of the impurity gas flows through the cleaning valves 82b, 82c. The pipe resistance of the impurity gas is larger than that of the hydrogen gas. Therefore, the flow rate of the cleaning gas flowing from the adsorption tower 60c to the adsorption tower 60b through the cleaning valves 82b, 82c is smaller than the flow rate of the cleaning gas in the normal operating condition. When the flow rate of the cleaning gas is small at the time of starting operation, as shown in FIG. 5, a large amount of the off gas is discharged in the desorption step of the adsorption tower 60c. Therefore, the temperature of the combustor 20 increases excessively in the desorption step of the adsorption tower 60c, and the excessive heat load is applied to the combustor 20.

Figure 6:
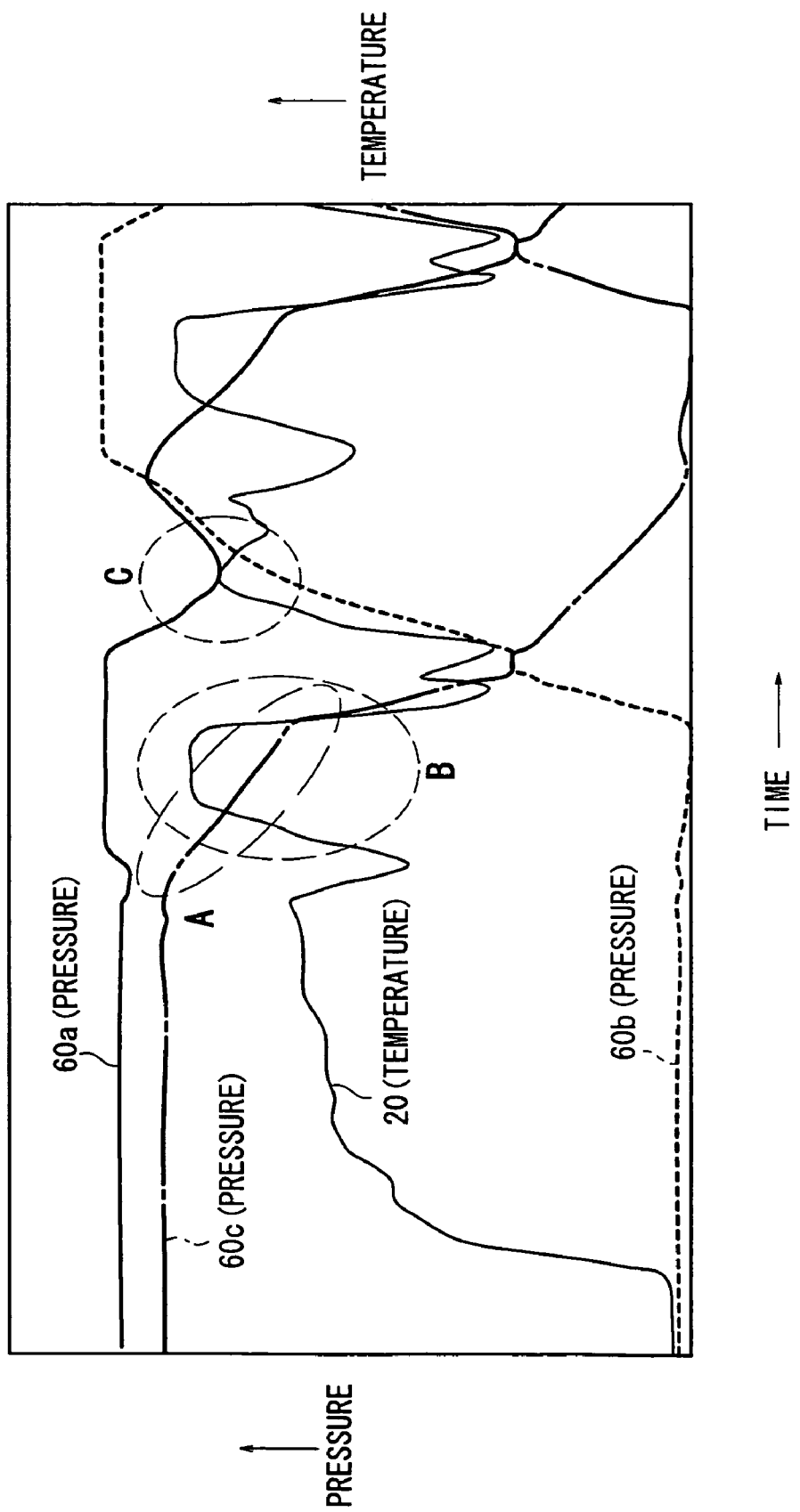
FIG. 6 is a diagram showing a condition in which operation of the PSA mechanism is started after a suspension period of one hour.

The above phenomenon will be described below specifically. For example, in the home fuel gas production system 10, it is assumed that the adsorption towers 60a through 60c of the PSA mechanism 42 are stopped at a predetermined normal stop position T3 (see FIG. 3) for a short period of time, e.g., one hour, and then, the operation is started again. In FIG. 6, among the adsorption towers 60a through 60c, when operation of the adsorption tower 60c which has been placed in a high pressure condition is started from the cleaning step, the pressure in the adsorption tower 60c decreases suitably (see an area in a broken circle A).

Therefore, the cleaning gas in the adsorption tower 60c is supplied into the adsorption tower 60b suitably, and the off gas calories supplied from the adsorption tower 60b to the combustor 20 are maintained effectively. Thus, the temperature of the combustor 20 increases suitably (see an area in a broken circle B). When the adsorption tower 60c is placed into the desorption step after the pressure equalization step, the off gas in the adsorption tower 60c is supplied to the combustor 20, and the temperature of the combustor 20 is maintained at the desired level (see an area in a broken circle C).

Figure 7:
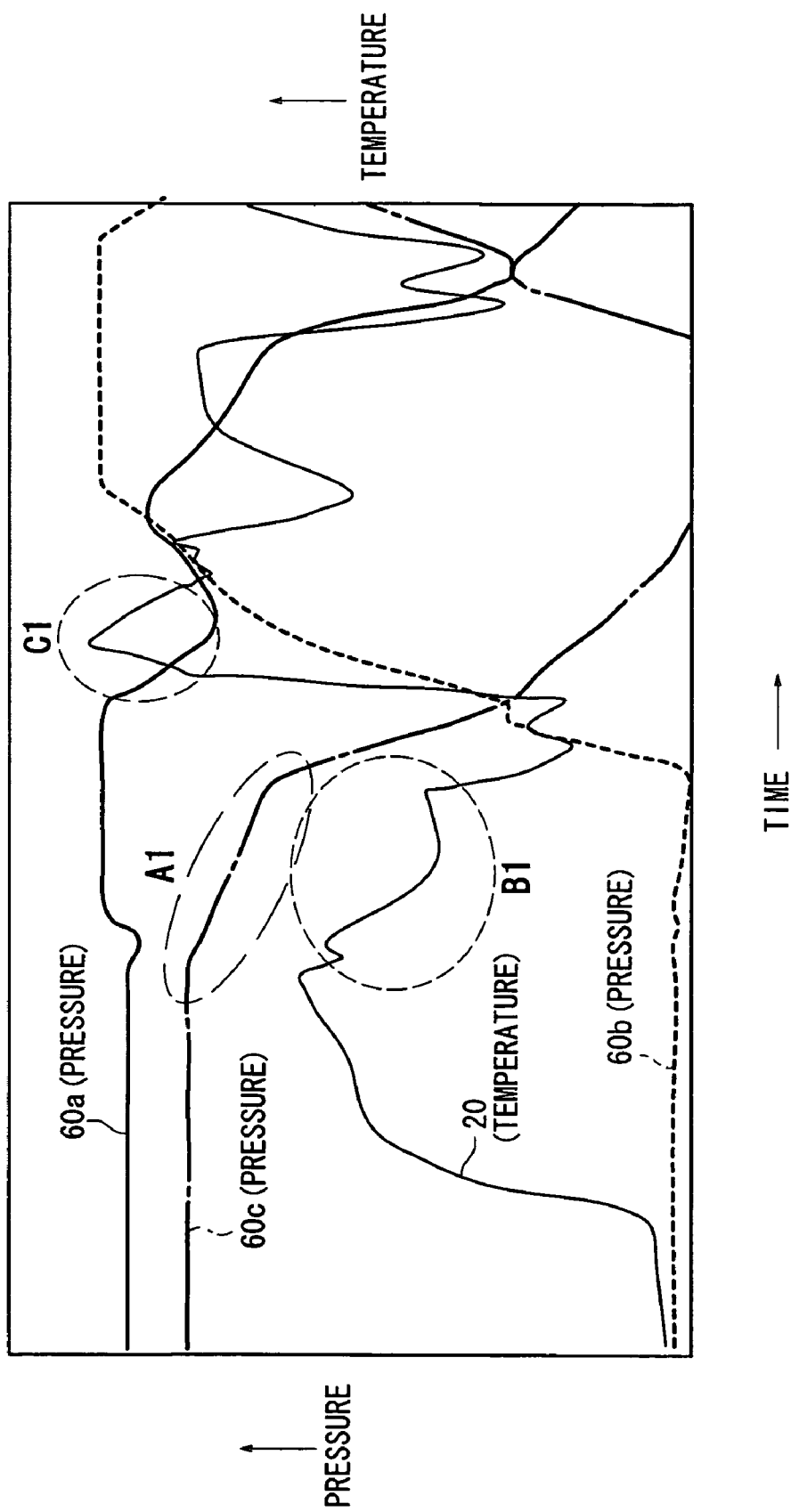
FIG. 7 is a diagram showing a condition in which operation of the PSA mechanism is started after a suspension period of one day.
Figure 8:
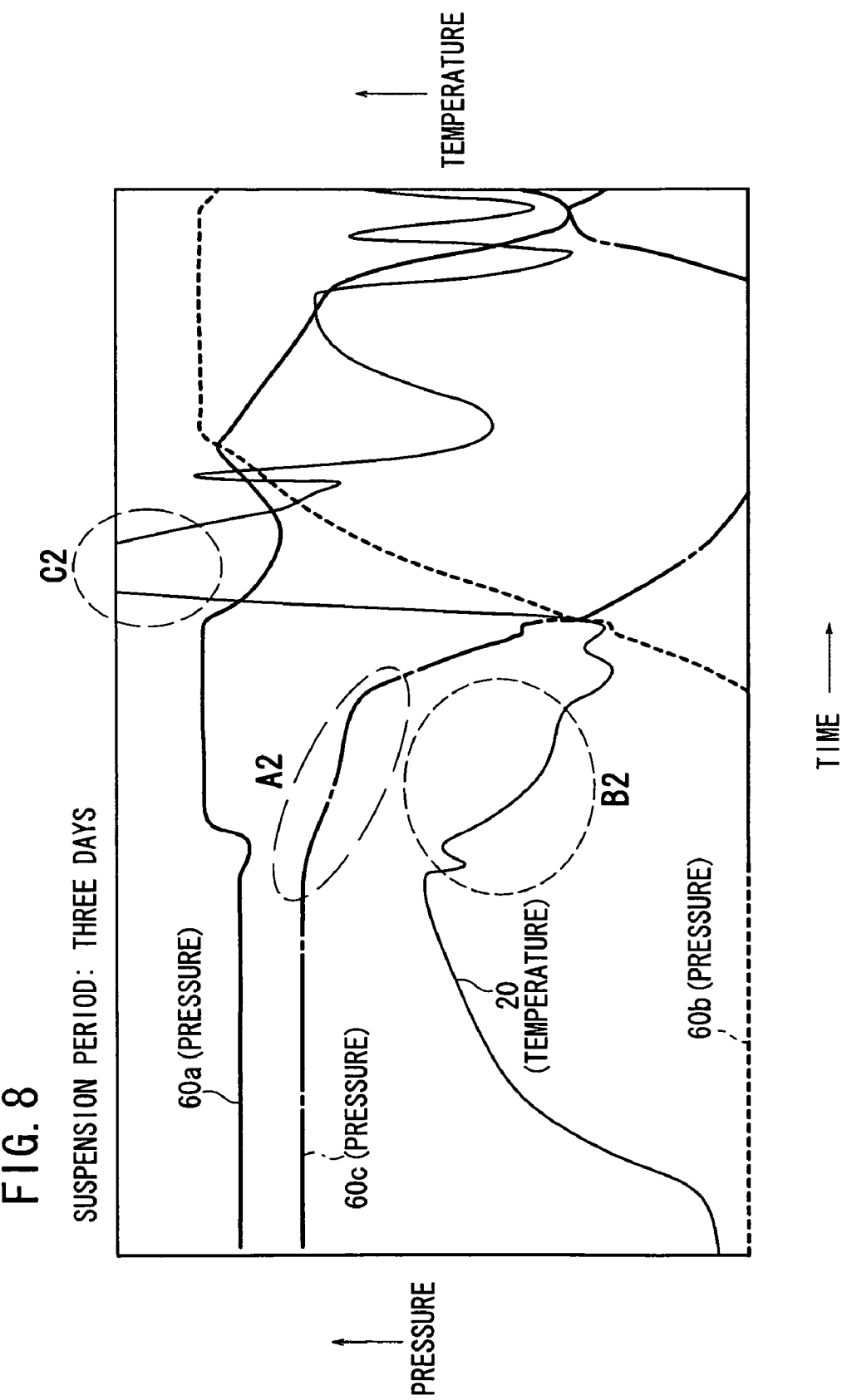
FIG. 8 is a diagram showing a condition in which operation of the PSA mechanism is started after a suspension period of three days.

Next, assuming that the PSA mechanism 42 starts its operation after a suspension period of, e.g., one day, in the adsorption tower 60c, hydrogen is mixed with impurities. Therefore, if operation of the adsorption tower 60c is started from the cleaning step, a large amount of the impurity gas is present in the upper portion in the adsorption tower 60c. Since the pipe resistance of the impurity gas is larger than that of the hydrogen gas, as shown in FIG. 7, the decrease of the pressure in the adsorption tower 60c is small in comparison with the above case in which operation is started after the suspension period of one hour (see an area in a broken circle A1).

Therefore, the amount of the cleaning gas supplied from the adsorption tower 60c to the adsorption tower 60b is small, and the amount of the off gas discharged from the adsorption tower 60c to the combustor 20 is small. Consequently, the temperature of the combustor 20 does not increase (see an area in a broken circle B1).

When operation of the adsorption tower 60c is switched from the pressure equalization step to the desorption step, since the amount of the off gas in the adsorption tower 60c is large, in the desorption step for releasing all the remaining pressure in the adsorption tower 60c, a large amount of the off gas is discharged to the combustor 20 to increase the temperature of the combustor 20 (see an area indicated by a broken circle C1).

Further, assuming that the PSA mechanism 42 starts its operation after a suspension period of, e.g., three days, the cleaning gas which is present in the upper portion of the adsorption tower 60c has the high impurity concentration in comparison with the case in which the PSA mechanism 42 starts its operation after the suspension period of one day. Thus, the cleaning gas does not flow from the adsorption tower 60c to the adsorption tower 60b smoothly, and the decrease of the pressure in the adsorption tower 60c is small in comparison with the case in which operation is started after the suspension period of one day (see an area in a broken circle A2).

Therefore, the amount of the off gas discharged into the combustor 20 is small. Consequently, the temperature of the combustor 20 does not increase (see an area in a broken circle B2). Thus, when operation of the adsorption tower 60c is switched to the desorption step, a large amount of the off gas is discharged from the adsorption tower 60c to the combustor 20 to increase the temperature of the combustor 20 considerably (see an area in a broken line C2).

In view of the above, according to the present invention, valve positions of at least either the cleaning valves 82a through 82c or the off gas valves 66a through 66c are adjusted to start the home fuel gas production system 10 without imposing the thermal load on the combustor 20. For this purpose, the following starting methods according to first through fourth embodiments are adopted.

Figure 9:
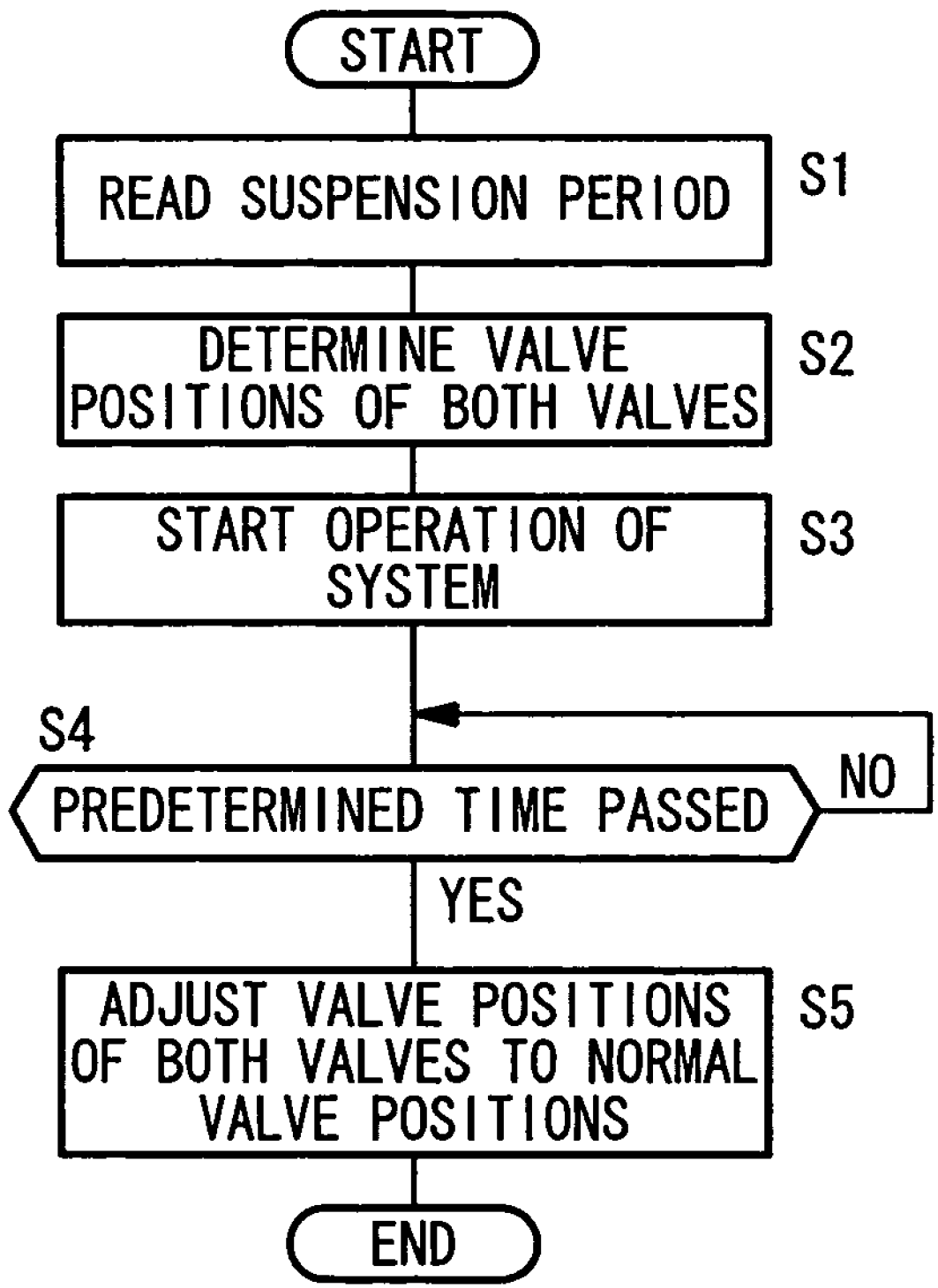
FIG. 9 is a flow chart showing a starting method according to a first embodiment of the present invention.

Firstly, a starting method according to the first embodiment of the present invention will be described with reference to a flow chart shown in FIG. 9.

In the home fuel gas production system 10, a suspension period of the PSA mechanism 42 is read by a timer (not shown) provided in the ECU 104 (step S1). The ECU 104 determines initial valve positions of the cleaning valves 82a through 82c and the off gas valves 66a through 66c based on the read suspension period using predetermined valve position determination maps (see FIGS. 10 and 11).

Figure 10:
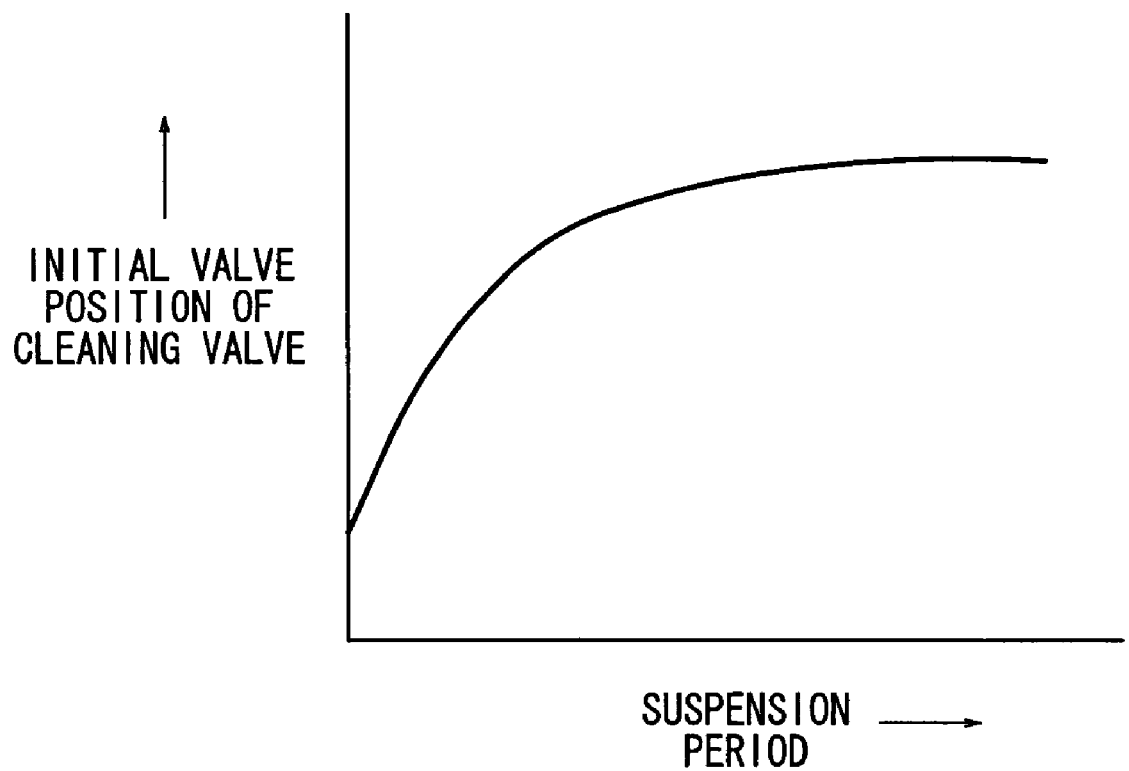
FIG. 10 is a map used for determining an initial valve position of a cleaning valve depending on the suspension period.

When the suspension period of the PSA mechanism 42 read by the timer becomes long, concentration of the impurity gas passing through the cleaning valves 82a through 82c becomes high. Therefore, as shown in FIG. 10, as the suspension period gets longer, the initial valve positions of the cleaning valves 82a through 82c are determined such that the cleaning valves 82a through 82c are opened widely, i.e., the openings of the cleaning valves 82a through 82c get larger. It is because the pipe resistance of the impurity gas is large in comparison with the hydrogen gas.

Figure 11:
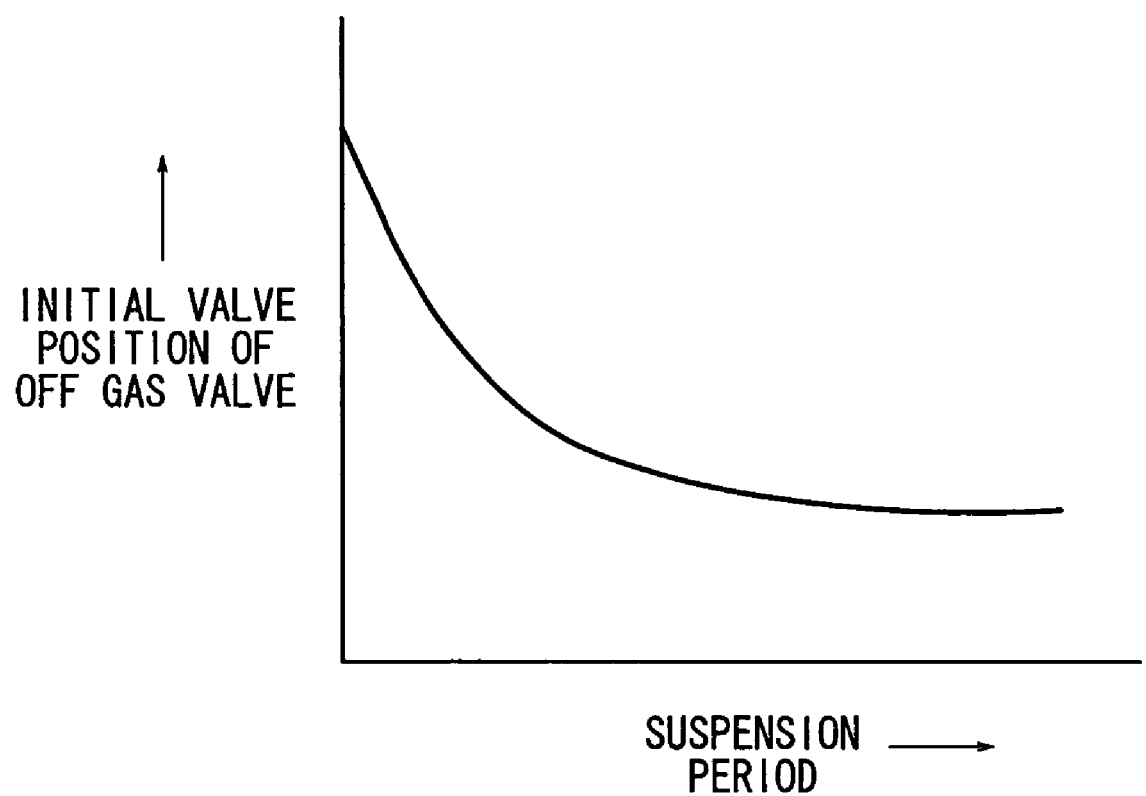
FIG. 11 is a map used for determining an initial vale position of an off gas valve depending on the suspension period.

Further, when the suspension period read by the timer becomes long, the amount of the off gas discharged from the adsorption towers 60a through 60c into the combustor 20 in the desorption step increases. Therefore, as shown in FIG. 11, as the suspension period gets longer, the initial valve positions of the off gas valves 66a through 66c are determined such that the off gas valves 66a through 66c are opened narrowly, i.e., the openings of the off gas valves 66a through 66c get smaller to limit the amount of the off gas discharged into the combustor 20.

Then, the routine proceeds to step S3 for starting operation of the home fuel gas production system 10. After operation of the PSA mechanism 42 is performed for a predetermined time in the initial valve positions (YES in step S4), the routine proceeds to step S5 for adjusting the valve positions of the cleaning valves 82a through 82c and the off gas valves 66a through 66c into valve positions of a normal operating condition.

Thus, in the first embodiment, as the suspension period of the PSA mechanism 42 gets longer, the initial valve positions of the cleaning valves 82a through 82c are determined such that the openings of the cleaning valves 82a through 82c get larger. Therefore, the cleaning gas having high impurity concentration can pass through the cleaning valves 82a through 82c smoothly. For example, when operation in the adsorption tower 60c is started from the cleaning step, it is possible to supply the cleaning gas from the adsorption tower 60c to the adsorption tower 60b smoothly, and decrease the pressure in the adsorption tower 60c suitably.

Thus, when operation in the adsorption tower 60c is switched to the desorption step, it is possible to prevent the large amount of the off gas from being discharged from the adsorption tower 60c to the combustor 20, and effectively prevent the thermal load from being imposed on the combustor 20.

Further, as the suspension period of the PSA mechanism 42 gets longer, the initial valve positions of the off gas valves 66a through 66c get smaller. Thus, for example, at the time of discharging the off gas from the adsorption tower 60c to the combustor 20 in the desorption step, no excessive off gas calories are supplied to the combustor 20. Thus, operation of the PSA mechanism 42 is started effectively and reliably.

In the first embodiment, both of the initial valve positions of the cleaning valves 82a through 82c and the initial valve positions of the off gas valves 66a through 66c are determined based on the suspension period of the PSA mechanism 42. Alternatively, only either the initial valve positions of the cleaning valves 82a through 82c or the initial valve positions of the off gas valves 66a through 66c may be determined based on the suspension period, and the valve positions of the remaining valves may be maintained at the valve positions of the normal operating condition. In the second through fourth embodiments as described later, similarly, only either the initial valve positions of the cleaning valves 82a through 82c or the initial valve positions of the off gas valves 66a through 66c may be determined.

Figure 12:
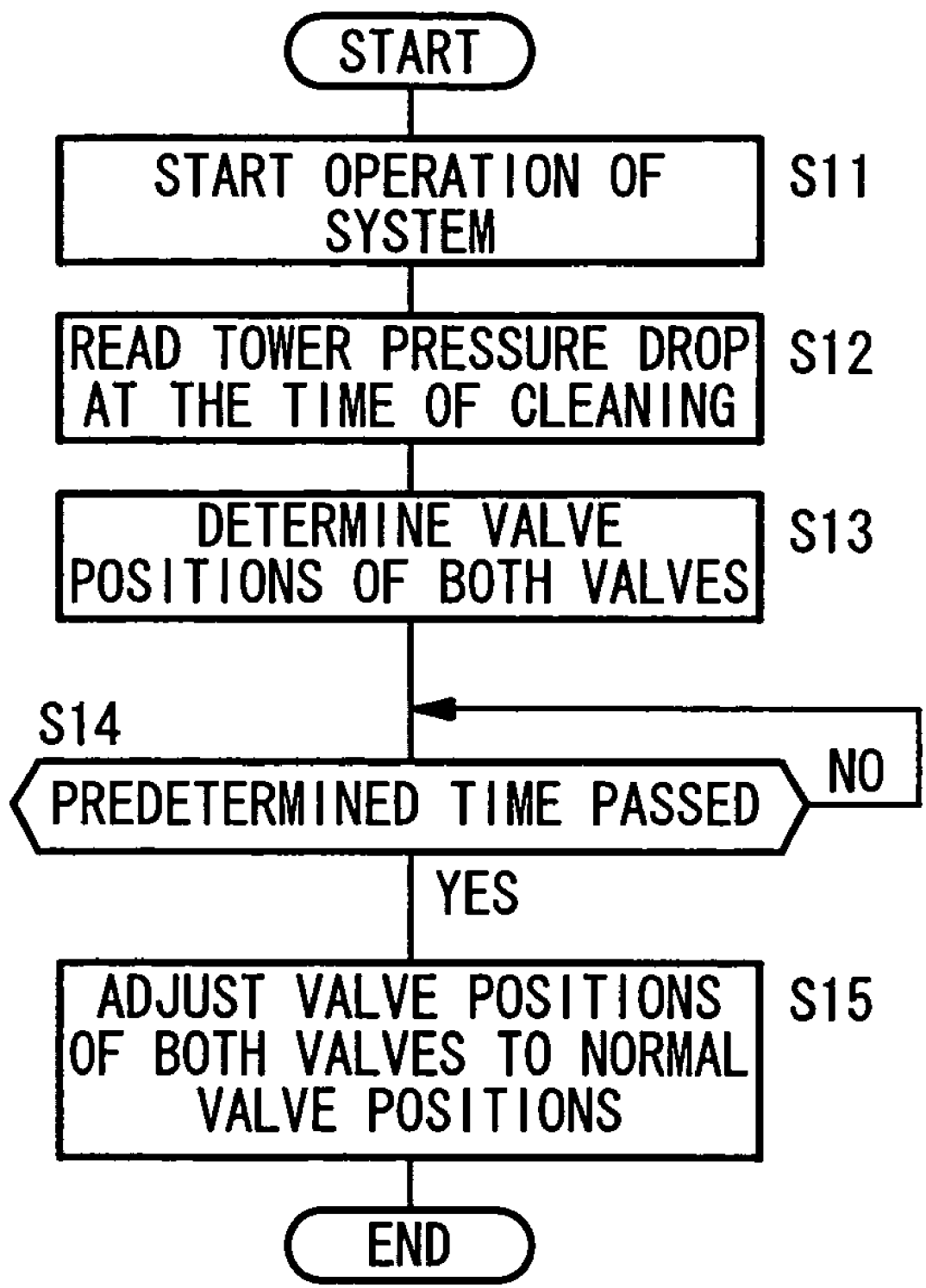
FIG. 12 is a flow chart showing a starting method according to a second embodiment of the present invention.

Next, a starting method according to the second embodiment of the present invention will be described with reference to a flow chart shown in FIG. 12.

In the second embodiment, firstly, operation of the home fuel gas production system 10 is started (step S11), and the cleaning step is started. For example, the pressure drop in the adsorption tower 60c at the time of cleaning is read (step S12). Based on the tower pressure drop, initial valve positions of the cleaning valves 82a through 82c and initial valve positions of the off gas valves 66a through 66c are determined (step S13).

Figure 13:
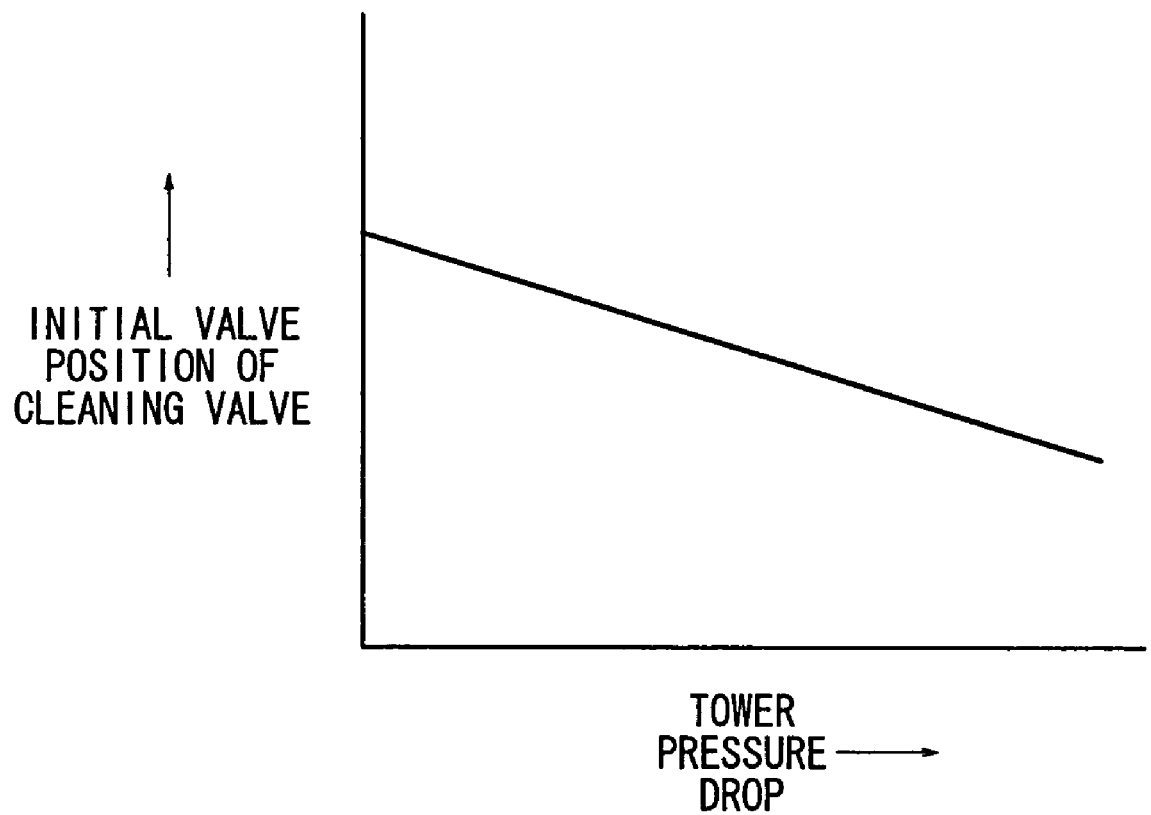
FIG. 13 is a map used for determining an initial valve position of the cleaning valve depending on the tower pressure drop.

The initial positions of the cleaning valves 82a through 82c based on the tower pressure drop are determined using a valve position determination map shown in FIG. 13. When the impurity concentration in the cleaning gas passing through the cleaning valves 82a through 82c is high, the cleaning gas does not pass through the cleaning valves 82a through 82c smoothly, and the tower pressure drop is small. Therefore, the valve positions of the cleaning valves 82a through 82c are determined such that the smaller the tower pressure drop is, the larger openings of the cleaning valves 82a through 82c are.

Figure 14:
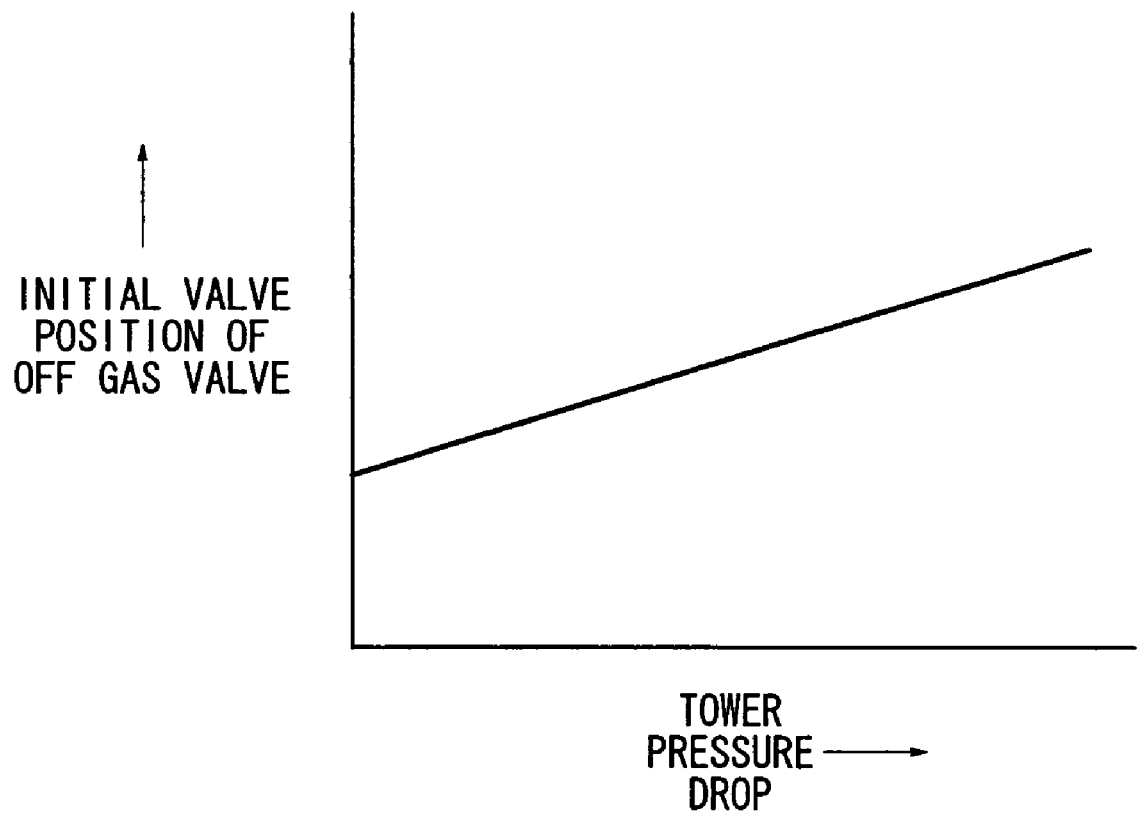
FIG. 14 is a map used for determining an initial valve position of the off gas valve depending on the tower pressure drop.

Further, the initial positions of the off gas valves 66a through 66c based on the tower pressure drop are determined using a valve position determination map shown in FIG. 14. If the tower pressure drop is small, concentration of the off gas remaining in the adsorption tower 60c is high. Therefore, the valve positions of the off gas valves 66a through 66c are determined such that the smaller the tower pressure drop is, the smaller openings of the off gas valves 66a through 66c are.

Then, the routine proceeds to step S14. After operation of the PSA mechanism 42 is performed for a predetermined time in the initial valve positions (YES in step S14), the routine proceeds to step S15 for adjusting the valve positions of the cleaning valves 82a through 82c and the off gas valves 66a through 66c into valve positions of the normal operating condition.

In the second embodiment, monitoring (reading) of the tower pressure drop is performed at the time of starting operation of the home fuel gas production system 10. Alternatively, monitoring (reading) of the tower pressure drops may also be performed continuously after the home fuel gas production system 10 is placed into the normal operating condition for adjusting the valve positions of the cleaning valves 82a through 82c and the off gas valves 66a through 66c into valve positions of the normal operating condition in a stepwise manner.

Further, if no abnormal condition is found after monitoring of the tower pressure drop is performed several times, it may be suitable to stop monitoring of the tower pressure drop. If any abnormal condition is found, the valve positions of the cleaning valves 82a through 82c should be adjusted accordingly. Thus, stable operation of the home fuel gas production system 10 is performed advantageously.

Likewise, in the third and fourth embodiments, timing of monitoring is not limited to the timing of starting operation, and monitoring may be performed in the normal operating condition. The monitoring results may be fed back to adjust the valve positions of the cleaning valves 82a through 82c and the off gas valves 66a through 66c.

Figure 15:
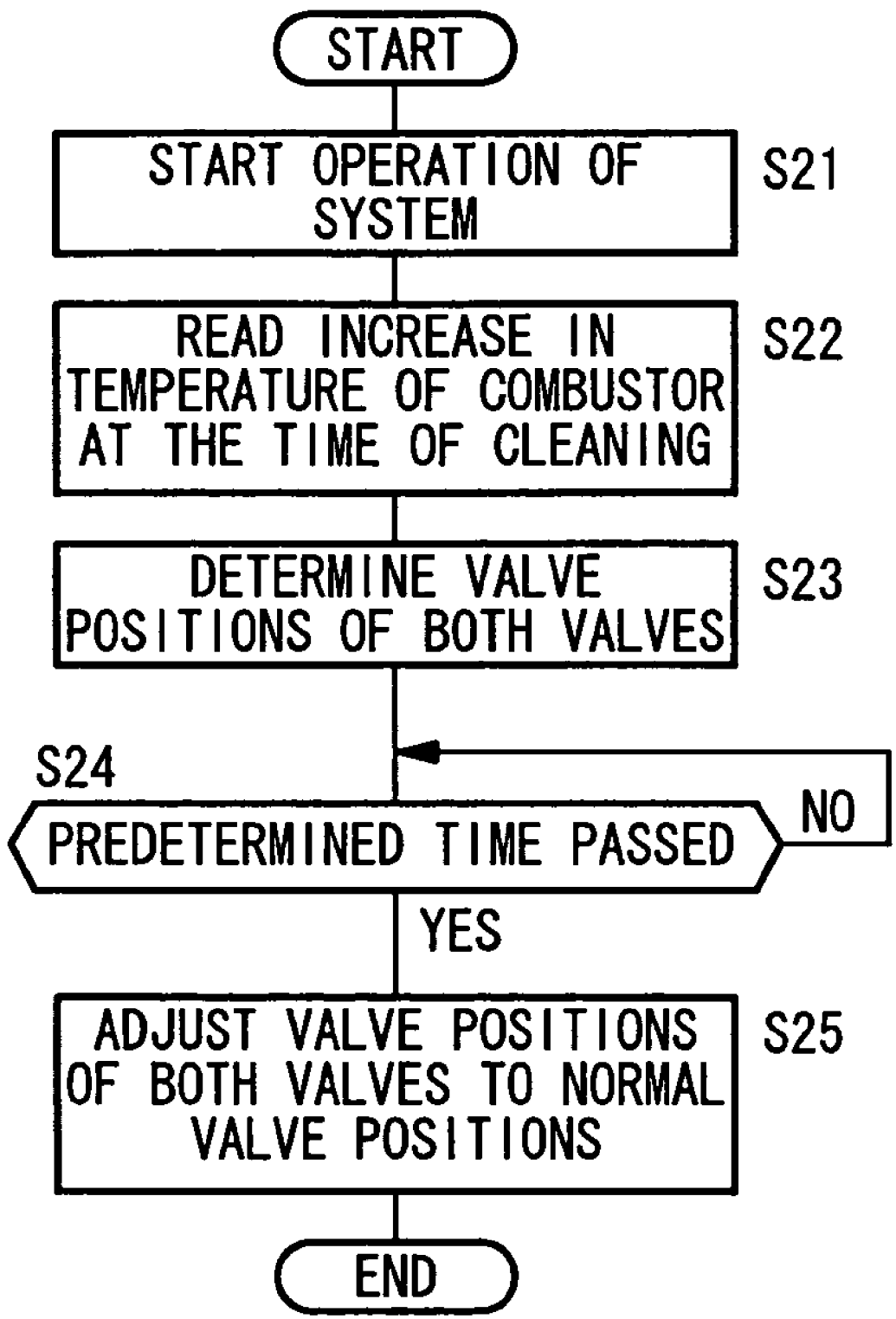
FIG. 15 is a flow chart showing a starting method according to a third embodiment of the present invention.

Next, a starting method according to the third embodiment will be described with reference to a flow chart shown in FIG. 15.

In the third embodiment, after operation of the home fuel gas production system 10 is started (step S21), the increase in the temperature of the combustor 20 at the time of cleaning is read (step S22). Then, based on the increase in the temperature of the combustor 20, valve positions of the cleaning valves 82a through 82c and valve positions of the off gas valves 66a through 66c are determined using valve position determination maps shown in FIGS. 16 and 17.

Figure 16:
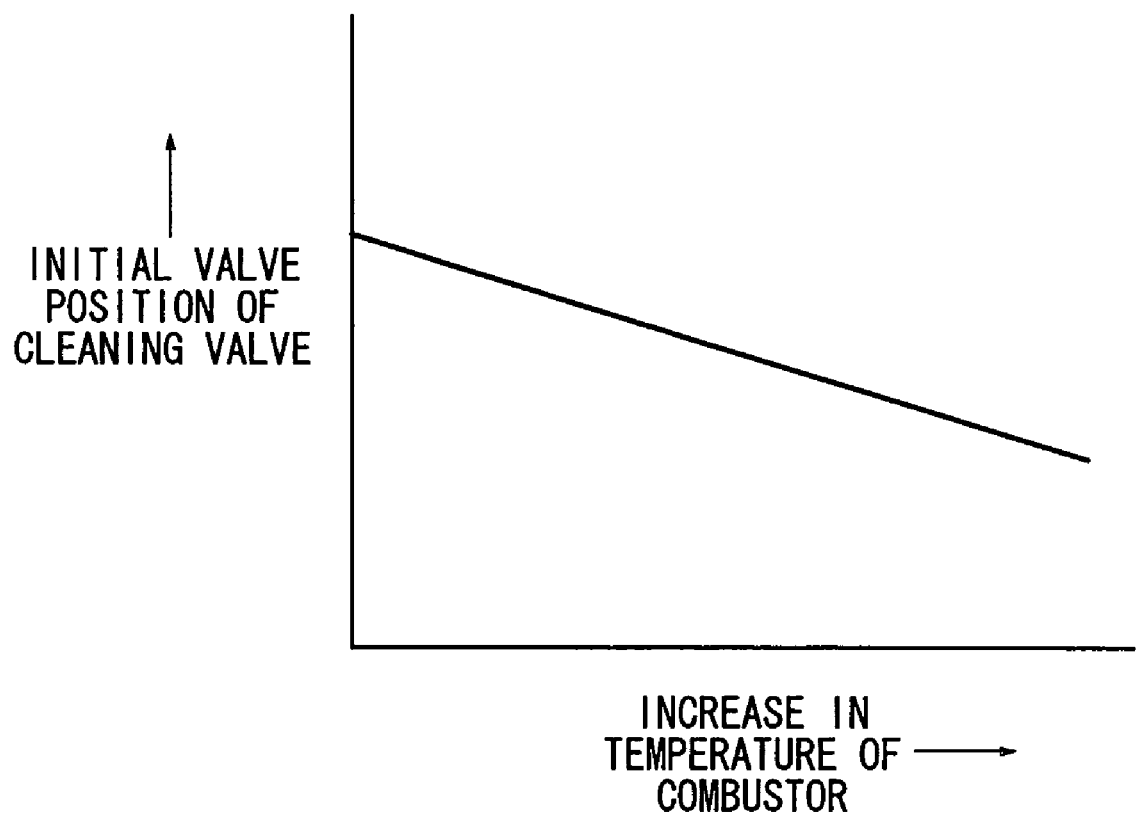
FIG. 16 is a map used for determining an initial valve position of the cleaning valve depending on the increase in the temperature of a combustor.
Figure 17:
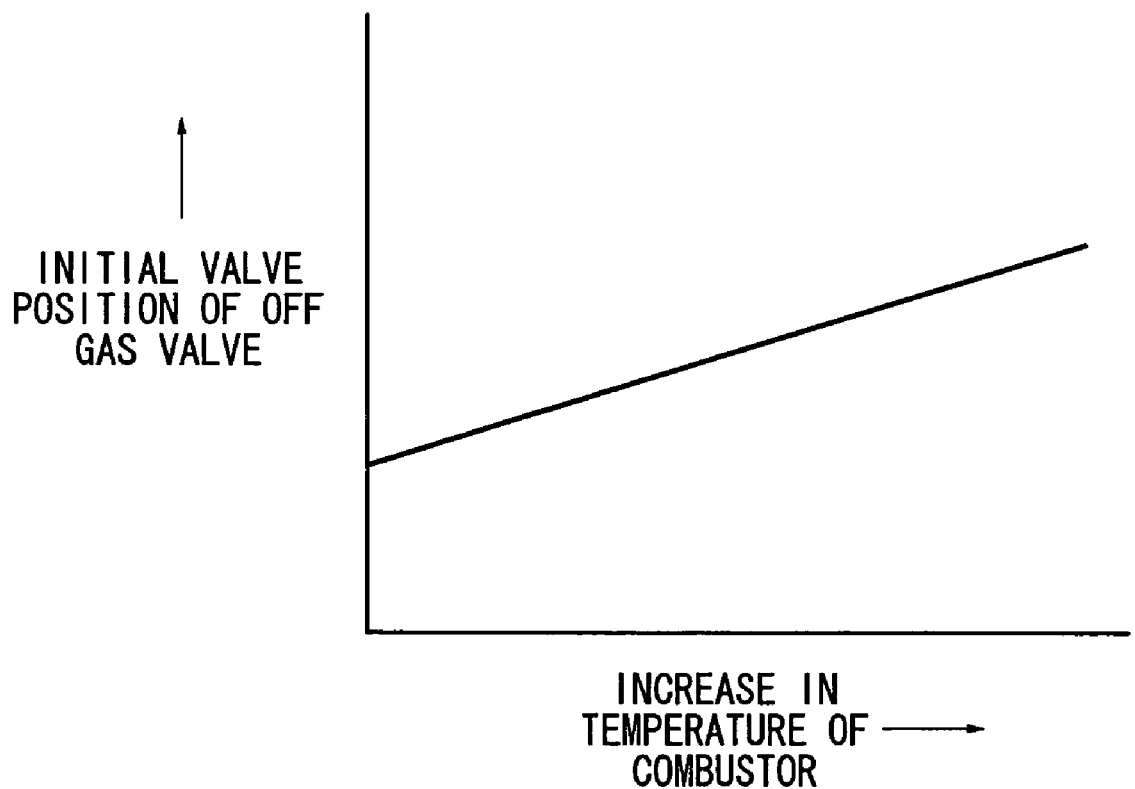
FIG. 17 is a map used for determining an initial valve position of the off gas valve depending on the increase in the temperature of the combustor.

As shown in FIG. 16, when the increase in the temperature of the combustor 20 is small, the cleaning gas does not flow smoothly. Therefore, the initial positions of the cleaning valves 82a through 82c are determined such that the cleaning valves 82a through 82c are opened widely, i.e., the openings of the cleaning valves 82a through 82c are large. Further, as shown in FIG. 17, when the increase in the temperature of the combustor 20 is small, the amount of the off gas discharged into the combustor 20 is large. Therefore, in order to reduce the amount of the off gas discharged into the combustor 20, the initial valve positions of the off gas valves 66a through 66c are determined such that the off gas valves 66a through 66c are opened narrowly, i.e., the openings of the off gas valves 66a through 66c are small.

After operation of the PSA mechanism 42 is performed for a predetermined time in the initial valve positions (YES in step S24), the routine proceeds to step S25 for adjusting the valve positions of the cleaning valves 82a through 82c and the off gas valves 66a through 66c into valve positions of the normal operating condition.

Figure 18:
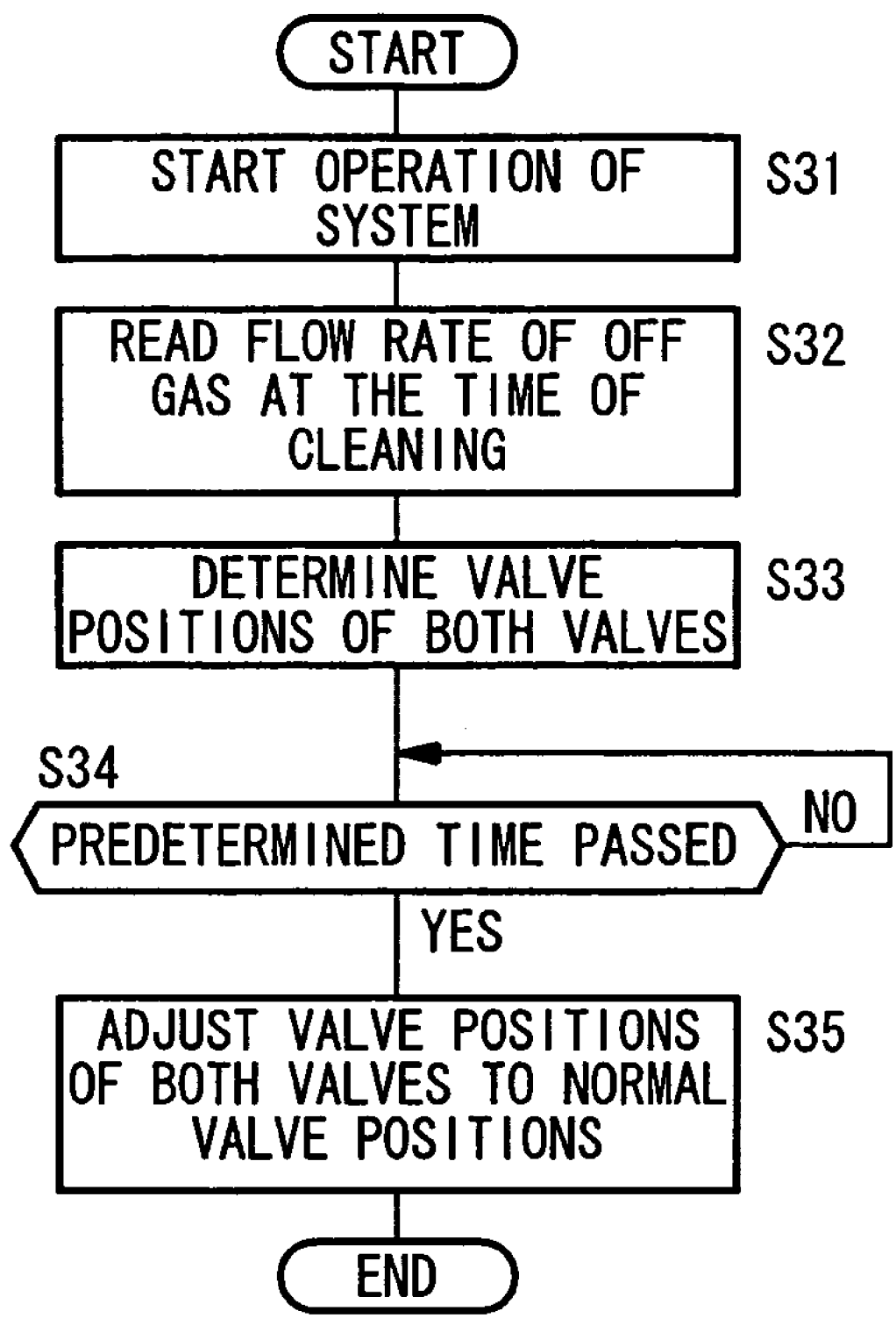
FIG. 18 is a flow chart showing a starting method according to a fourth embodiment of the present invention.

Next, a starting method according to the fourth embodiment will be described with reference to a flow chart shown in FIG. 18.

In the forth embodiment, firstly, after operation of the home fuel gas production system 10 is started (step S31), the routine proceeds to step S32, and the flow rate of the off gas at the time of cleaning is measured. For example, the flow rate of the off gas is measured by a flow rate meter 106 provided in the off gas discharge passage 68 (see FIG. 2). Based on the off gas flow rate, valve positions of the cleaning valves 82a through 82c and valve positions of the off gas valves 66a through 66c are determined using valve position determination maps shown in FIGS. 19 and 20 (step S33).

Figure 19:
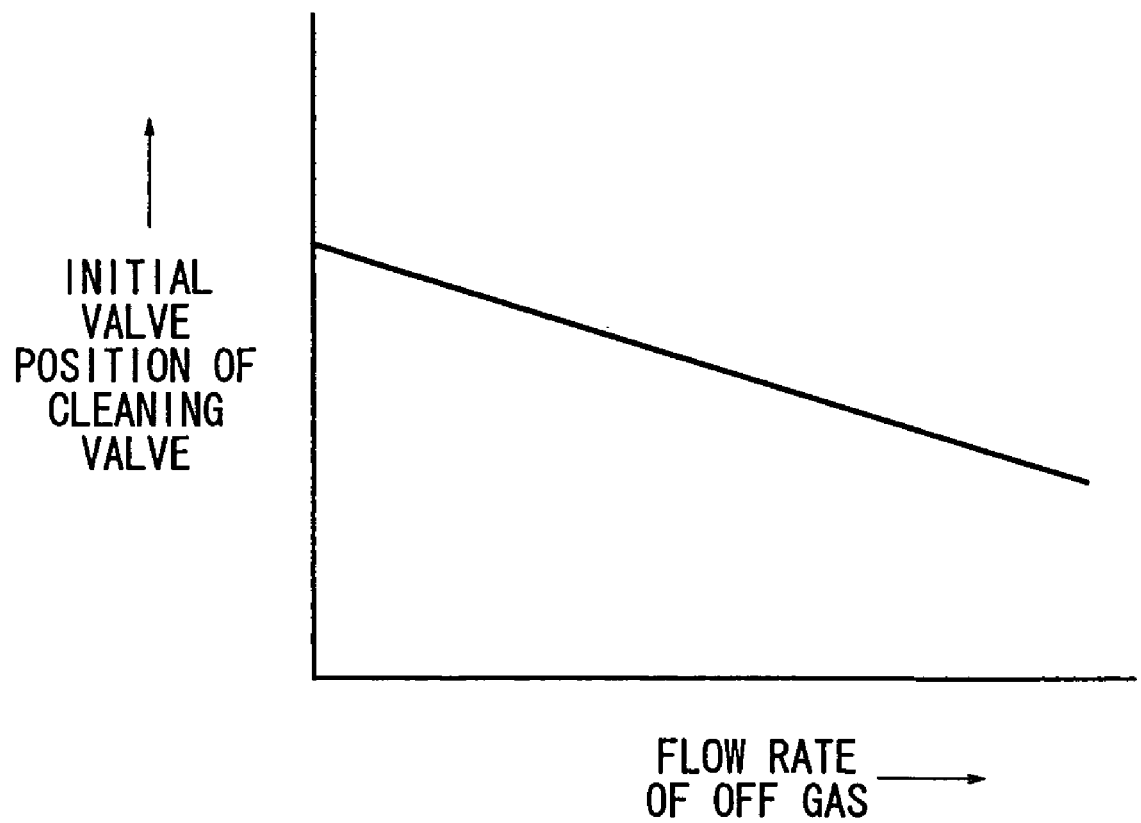
FIG. 19 is a map used for determining an initial valve position of the cleaning valve depending on the flow rate of the off gas at the time of cleaning.
Figure 20:
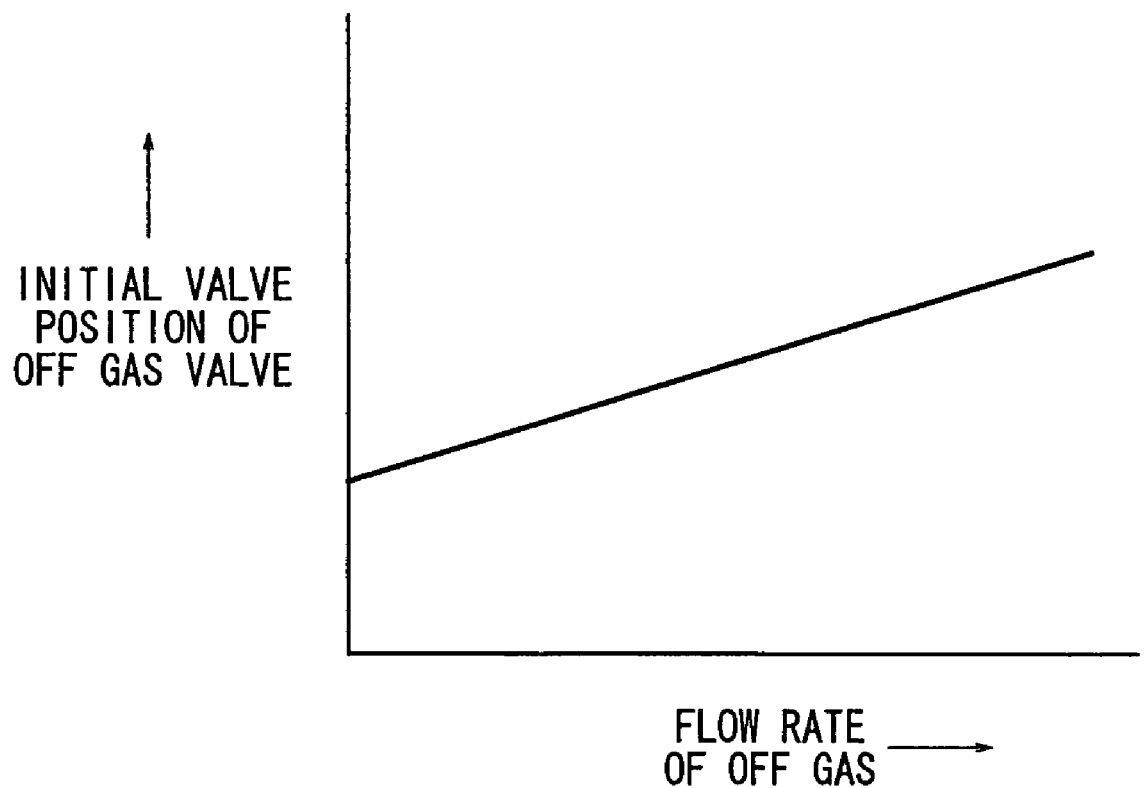
FIG. 20 is a map used for determining an initial valve position of the off gas valve depending on the flow rate of the off gas at the time of cleaning.
Figure 21:
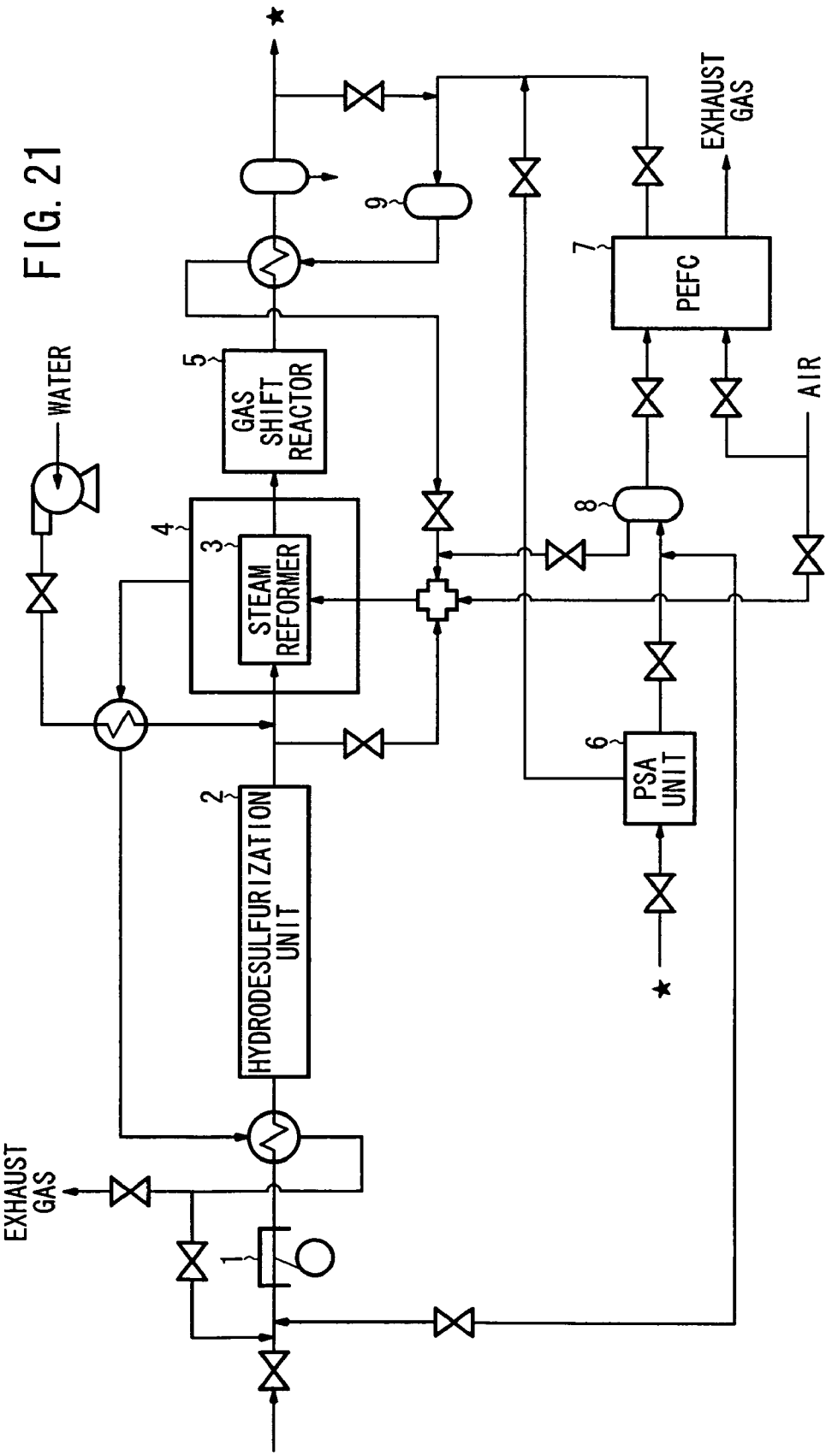
FIG. 21 is a block diagram schematically showing a system disclosed in Japanese Laid-Open Patent Publication No. 2002-20102.

As shown in FIG. 19, when the flow rate of the off gas at the time of cleaning is small, the cleaning gas does not flow smoothly. Therefore, the initial valve positions of the cleaning valves 82a through 82c are determined such that the cleaning valves 82a through 82c are opened widely, i.e., the openings of the cleaning valves 82a through 82c are large. Further, as shown in FIG. 20, when the flow rate of the off gas at the time of cleaning is small, the flow rate of the off gas discharged into the combustor 20 in the desorption step is large. Therefore, the initial valve positions of the off gas valves 66a through 66c are determined such that the off gas valves 66a through 66c are opened narrowly, i.e., the openings of the off gas valves 66a through 66c are small.

Under this condition, after operation of the PSA mechanism 42 is performed for a predetermined time (YES in step S34), the routine proceeds to step S35 for adjusting the valve positions of the cleaning valves 82a through 82c and the off gas valves 66a through 66c into valve positions of the normal operating condition.

The internal conditions of the PSA mechanism 42 such as the tower pressure drop, the increase in the temperature of the combustor 20, and the flow rate of the off gas discharged from the PSA mechanism 42 vary depending on the suspension period before operation of the PSA mechanism 42. As described above, in the second through fourth embodiments, either the valve positions of the cleaning valves 82a through 82c or the off gas valves 66a through 66c or both of the cleaning valves 82a through 82c and the off gas valves 66a through 66c are adjusted based on the internal conditions.

Therefore, regardless of the length of the suspension period immediately before operation of the PSA mechanism 42, the cleaning step and the desorption step can be performed smoothly, and it is possible to prevent the shortage of the off gas calories or excessive release of the off gas calories. Thus, the same advantages as with the first embodiment can be obtained. For example, in particular, it is possible to effectively prevent the thermal load from being imposed on the combustor 20.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A method of starting operation of a fuel gas production apparatus, said fuel gas production apparatus comprising:
   a reforming unit for reforming a hydrogen-containing fuel to obtain a reformed gas; and
   a refining unit including a pressure swing adsorption mechanism for removing impurities from said reformed gas to refine said reformed gas into a hydrogen-rich fuel gas, said pressure swing adsorption mechanism including adsorption towers, cleaning valves for connecting said adsorption towers with each other for cleaning, and off gas valves for discharging a gas remaining in said adsorption towers, said method comprising the steps of:
   detecting an operation suspension period of said pressure swing adsorption mechanism or an internal condition which varies depending on said operation suspension period;
   adjusting valve positions of at least either said cleaning valves or said off gas valves based on said operation suspension period or said internal condition detected in said detecting step;
   adjusting the valve positions of said cleaning valves such that openings if said cleaning valves get larger as said operation suspension period gets longer;
   adjusting the valve positions of said off gas valves are adjusted such that openings of said off gas valves gets smaller as said operation suspension period gets longer; and
   operating said pressure swing adsorption mechanism for a predetermined time in the adjusted valve positions, and then, adjusting the valve positions into valve positions of a normal operating condition.

2. A staffing method according to claim 1, further comprising the step of performing said step of operating said pressure swing adsorption mechanism for the predetermined time in the adjusted valve positions, and then, adjusting the valve positions into valve positions of the normal operating condition is at the time of a staffing operation of said pressure swing adsorption mechanism.

3. A staffing method according to claim 1, further comprising the step of determining valve positions of at least either said cleaning valves or said off gas valves based on a tower pressure drop, wherein said internal condition comprises pressures in said adsorption towers.

4. A starting method according to claim 3, further comprising the step of determining the valve positions of said cleaning valves and the valve positions of said off gas valves based on the tower pressure drop such that the smaller the tower pressure drop is, the larger openings of the cleaning valves are and the smaller openings of the off gas valves are.

5. A staffing method according to claim 1, further comprising the step of determining the valve positions of at least either said cleaning valves or said off gas valves based on the increase in the temperature of a combustor provided for an evaporator to evaporate said hydrogen-containing fuel.

6. A starting method according to claim 5, further comprising the step of determining the valve positions of said cleaning valves and valve positions of said off gas valves based on the increase in the temperature such that the smaller the increase in the temperature is, the larger openings of the cleaning valves are and the smaller openings of the off gas valves are.

7. A starting method according to claim 1, further comprising the step of determining the valve positions of at least either said cleaning valves or said off gas valves based on the flow rate of the remaining gas discharged from said adsorption towers.

8. A starting method according to claim 7, further comprising the step of determining the valve positions of said cleaning valves and the valve positions of said off gas valves based on the flow rate of the remaining gas discharged from said adsorption towers such that the smaller the flow rate of the remaining gas discharged from said adsorption towers is, the larger openings of the cleaning valves are and the smaller openings of the off gas valves are.

* * * * *